(12) United States Patent
Mizukami et al.

(10) Patent No.: US 8,094,357 B2
(45) Date of Patent: Jan. 10, 2012

(54) MIRROR CONTROL DEVICE

(75) Inventors: Masato Mizukami, Kanagawa (JP); Johji Yamaguchi, Kanagawa (JP); Naru Nemoto, Kanagawa (JP); Shingo Uchiyama, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 443 days.

(21) Appl. No.: 12/307,920

(22) PCT Filed: Jul. 27, 2007

(86) PCT No.: PCT/JP2007/064787
§ 371 (c)(1),
(2), (4) Date: Jan. 7, 2009

(87) PCT Pub. No.: WO2008/013271
PCT Pub. Date: Jan. 31, 2008

(65) Prior Publication Data
US 2009/0244677 A1    Oct. 1, 2009

(30) Foreign Application Priority Data

Jul. 27, 2006 (JP) ................................. 2006-204396
Aug. 18, 2006 (JP) ................................. 2006-223070
Aug. 18, 2006 (JP) ................................. 2006-223075

(51) Int. Cl.
*G02B 26/10* (2006.01)
*G05B 1/00* (2006.01)

(52) U.S. Cl. ............... 359/224.1; 359/226.2; 359/223.1; 359/872; 359/871; 359/877; 318/466; 369/228

(58) Field of Classification Search .................. 318/466, 318/286, 369, 396; 359/225.1, 226.1, 223.1, 359/224.1, 226.2, 871, 872, 877
See application file for complete search history.

(56) References Cited

U.S. PATENT DOCUMENTS

| 5,864,215 A * | 1/1999 | Shen et al. .................... 318/560 |
| 5,912,758 A * | 6/1999 | Knipe et al. .................. 359/290 |
| 6,046,840 A * | 4/2000 | Huibers ........................ 359/291 |
| 6,333,584 B1 * | 12/2001 | Jerman et al. ................. 310/309 |

(Continued)

FOREIGN PATENT DOCUMENTS

JP    09-189871    7/1997

(Continued)

OTHER PUBLICATIONS

Ford et al., "Wavelength Add-Drop Switching Using Tilting Micormirrors", IEEE, Journal of Lightwave Technology, vol. 17, No. 5, May 1999.

(Continued)

*Primary Examiner* — Rita Leykin
(74) *Attorney, Agent, or Firm* — Blakely, Sokoloff, Taylor & Zafman

(57) ABSTRACT

A mirror control device includes a pivotally supported mirror (230), electrodes (340a-340d) spaced apart from the mirror (230), a driving voltage generation means (401) for generating a driving voltage corresponding to the desired tilt angle of the mirror (230) for each electrode, a bias voltage generation means (402) for generating, as a bias voltage for each electrode, a voltage which causes the tilt angle of the mirror (230) to have the same predetermined value upon being independently applied to each of the electrodes (340a-340d), and an electrode voltage applying means (403) for adding, for each electrode, the bias voltage to the driving voltage and applying the voltage after addition to a corresponding one of the electrodes (340a-340d).

27 Claims, 13 Drawing Sheets

U.S. PATENT DOCUMENTS

| | | | |
|---|---|---|---|
| 6,337,760 B1* | 1/2002 | Huibers et al. | 359/291 |
| 6,504,641 B2* | 1/2003 | Chan et al. | 359/254 |
| 6,525,864 B1* | 2/2003 | Gee et al. | 359/291 |
| 6,543,286 B2* | 4/2003 | Garverick et al. | 73/514.18 |
| 6,583,921 B2* | 6/2003 | Nelson | 359/291 |
| 6,705,165 B2* | 3/2004 | Garverick et al. | 73/514.18 |
| 6,760,144 B2* | 7/2004 | Hill et al. | 359/290 |
| 6,771,851 B1* | 8/2004 | Yang | 385/18 |
| 6,795,603 B2* | 9/2004 | Utsunomiya | 385/18 |
| 6,859,300 B2* | 2/2005 | Greywall | 359/291 |
| 6,961,257 B2* | 11/2005 | Garverick et al. | 365/49.1 |
| 6,995,896 B2* | 2/2006 | Yamabana et al. | 359/291 |
| 7,015,620 B2* | 3/2006 | Greywall | 310/309 |
| 7,042,621 B2* | 5/2006 | Maeda et al. | 359/290 |
| 7,088,494 B2* | 8/2006 | Mizuno | 359/291 |
| 7,116,465 B2* | 10/2006 | Maeda et al. | 359/291 |
| 7,193,492 B2* | 3/2007 | Greywall et al. | 335/78 |
| 7,356,880 B2* | 4/2008 | Mizuno | 16/277 |
| 2006/0018049 A1* | 1/2006 | Mizuno | 359/871 |
| 2008/0100899 A1* | 5/2008 | Shimokawa et al. | 359/225 |

FOREIGN PATENT DOCUMENTS

| | | |
|---|---|---|
| JP | 09-318892 | 12/1997 |
| JP | 2002-236365 A | 8/2002 |
| JP | 2003-057575 A | 2/2003 |
| JP | 2004-294877 A | 10/2004 |
| JP | 2005-017799 A | 1/2005 |
| JP | 2005-208164 A | 8/2005 |

OTHER PUBLICATIONS

Dokmeci et al., "Two-Axis Single-Crystal Silicon Micromirror Arrays", IEEE, Journal of Microelectromechanical Systems, vol. 13, No. 6, Dec. 2004.

* cited by examiner

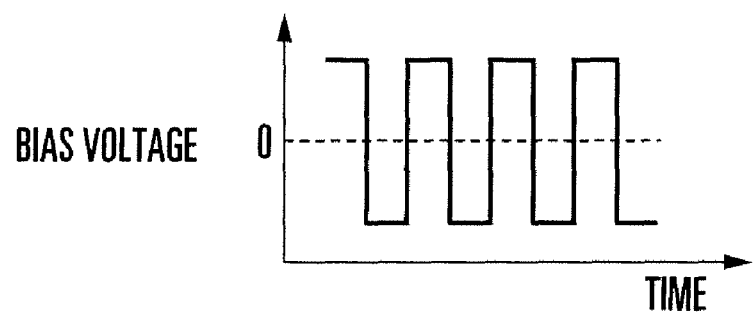
F I G. 23A
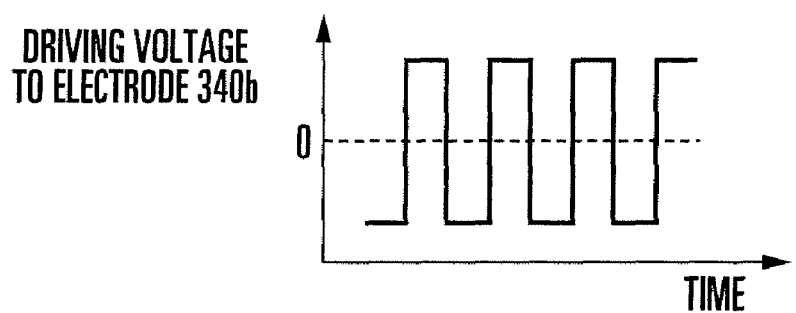
F I G. 23B
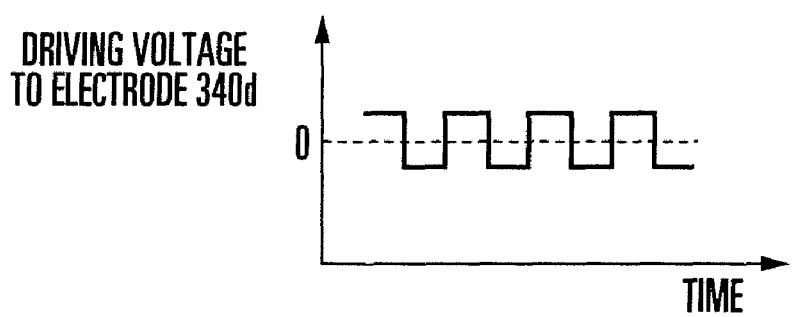
F I G. 23C

MIRROR CONTROL DEVICE

The present patent application is a Utility claiming the benefit of Application No. PCT/JP2007/064787, filed Jul. 27, 2007.

TECHNICAL FIELD

The present invention relates to a mirror control device used for a scanner or an optical switch for communication.

BACKGROUND ART

As a technique of implementing hardware such as an optical switch, Japanese Patent Laid-Open No. 2003-57575 has proposed a mirror control device manufactured by micromachining. FIG. 1 is an exploded perspective view showing the arrangement of a mirror control device according to the first embodiment of the present invention. FIG. 2 is a sectional view of the mirror control device shown in FIG. 1. A conventional mirror control device also has the same mechanical arrangement as that of the first embodiment. The conventional mirror control device will briefly be described with reference to FIGS. 1 and 2.

In a mirror control device 100, a mirror substrate 200 having a mirror, and an electrode substrate 300 having electrodes are arranged in parallel.

The mirror substrate 200 includes a plate-shaped frame portion 210, a gimbal 220 arranged in the opening of the frame portion 210, and a mirror 230 arranged in the opening of the gimbal 220. The gimbal 220 can pivot about a gimbal pivot axis x in FIG. 1 which passes through a pair of torsion springs 211a and 211b. Similarly, the mirror 230 can pivot about a mirror pivot axis y in FIG. 1 which passes through a pair of torsion springs 221a and 221b. As a result, the mirror 230 pivots about the two axes which are perpendicular to each other.

The electrode substrate 300 includes a plate-shaped base portion 310, and a terrace-shaped projecting portion 320. Four electrodes 340a to 340d are formed on the four corners of the projecting portion 320 and the upper surface of the base portion 310 led out of the four corners. An insulating layer 311 made of, e.g., silicon oxide is formed on the surface of the base portion 310. The electrodes 340a to 340d, leads 341a to 341d, and interconnections 370 are formed on the insulating layer 311.

In the mirror control device 100, the mirror 230 is grounded. Positive driving voltages are applied to the electrodes 340a to 340d such that asymmetrical potential differences are generated between them, thereby attracting the mirror 230 by an electrostatic attraction and making it pivot in an arbitrary direction.

DISCLOSURE OF INVENTION

Problem to be Solved by the Invention

In the conventional mirror control device, the driving voltage vs. tilt angle characteristic of the mirror 230 changes depending on the pivot direction. The driving voltage vs. tilt angle characteristic of the mirror 230 changes depending on the pivot direction because of, e.g., the central position shift between the electrodes 340a to 340d and the mirror 230, errors in the shapes of the electrodes 340a to 340d, and the stiffness difference between the torsion springs 211a and 211b about the pivot axis x and the torsion springs 221a and 221b about the pivot axis y.

If the driving voltage vs. tilt angle characteristic changes depending on the pivot direction, the tilt angle of the mirror 230 changes depending on the pivot direction even when the applied driving voltages do not change. To correct the characteristic difference generated depending on the pivot direction, it is necessary to change the driving voltages in accordance with the pivot direction of the mirror 230, resulting in cumbersome control. For control of the mirror 230, a uniform driving voltage vs. tilt angle characteristic is preferably obtained in any direction.

In the conventional mirror control device, DC voltages are applied to the electrodes 340a to 340d. This polarizes the stray capacitance (e.g., insulating layer 311) between the electrodes 340a to 340d and the mirror 230 upon voltage application of the electrodes 340a to 340d or accumulates charges in the stray capacitance due to some reason. Discharge or charge occurs gradually and influences the driving force of the mirror 230. For this reason, when operating the mirror 230, the potential between the mirror 230 and the electrodes 340a to 340d varies over time, and the tilt angle of the mirror 230 gradually varies. That is, drift occurs.

In the conventional mirror control device, it is necessary to apply a large driving voltage corresponding to the tilt angle of the mirror 230 to the electrodes 340a to 340d at the time of driving. The relationship between the driving voltage and an electrostatic attraction or the relationship between the driving voltage and the tilt angle of the mirror 230 is determined by the distance between the mirror 230 and the electrodes 340a to 340d, the restoring force of the torsion springs that support the mirror 230, or the area of the electrodes 340a to 340d. A high driving voltage of, e.g., several ten V to several hundred V needs to be applied to the electrodes 340a to 340d. Hence, a power supply capable of generating a high voltage is necessary.

The present invention has been made to solve the above problems, and has as its object to provide a mirror control device capable of reducing a difference in the driving voltage vs. tilt angle characteristic depending on the pivot direction of a mirror.

It is another object of the present invention to provide a mirror control device capable of suppressing drift of a mirror.

It is still another object of the present invention to provide a mirror control device capable of lowering the driving voltage of a mirror.

Means of Solution to the Problem

According to the present invention, there is provided a mirror control device comprising a mirror which is pivotally supported, a plurality of electrodes which are spaced apart from the mirror, driving voltage generation means for generating a driving voltage corresponding to a desired tilt angle of the mirror for each electrode, bias voltage generation means for generating, as a bias voltage for each electrode, a voltage which causes the tilt angle of the mirror to have a predetermined value upon being independently applied to each electrode, and electrode voltage applying means for adding, for each electrode, the bias voltage to the driving voltage and applying the voltage after addition to a corresponding one of the electrodes.

According to the present invention, there is also provided a mirror control device comprising a mirror which is pivotally supported, a plurality of electrodes which are spaced apart from the mirror, and driving voltage applying means for generating an AC voltage as a driving voltage in accordance with a desired tilt angle of the mirror and applying the driving voltage to each electrode so as to generate at least a first section where a potential difference between the mirror and the electrode to which the driving voltage is applied is positive and a second section where the potential difference between the mirror and the electrode to which the driving voltage is applied is negative.

According to the present invention, there is also provided a mirror control device comprising a mirror which is pivotally supported, a plurality of electrodes which are spaced apart from the mirror, bias voltage applying means for applying a nonzero bias voltage to the mirror, and driving voltage applying means for applying a driving voltage of a polarity opposite to the bias voltage to at least one of the plurality of electrodes.

Effects of the Invention

According to the present invention, a voltage which causes the tilt angle of the mirror to have a predetermined value upon being independently applied to each electrode is generated as a bias voltage for each electrode and applied, thereby reducing a difference in the driving voltage vs. tilt angle characteristic depending on the pivot direction of the mirror. Consequently, in the present invention, it is unnecessary to consider a change in the driving voltage vs. tilt angle characteristic depending on the pivot direction of the mirror when generating the driving voltage corresponding to the desired tilt angle of the mirror.

According to the present invention, an AC voltage is generated as a driving voltage and applied to each electrode so as to generate at least a first section where the potential difference between the mirror and the electrode to which the driving voltage is applied is positive and a second section where the potential difference is negative. Since charges accumulated in the stray capacitance between the electrode and the mirror can be almost zero, it is possible to suppress drift of the mirror.

According to the present invention, when a nonzero bias voltage is applied to the mirror, the driving voltage can be lower. Hence, a power supply for outputting a lower voltage than before is usable for the bias voltage applying means and the driving voltage applying means. Additionally, when a driving voltage of a polarity opposite to the bias voltage is applied to at least one of the plurality of electrodes, the force for driving the mirror can be increased.

BRIEF DESCRIPTION OF DRAWINGS

FIG. 23A is a timing chart showing an example of a bias voltage applied to a mirror according to the 10th embodiment of the present invention;

FIG. 23B is a timing chart showing an example of a driving voltage applied to one electrode according to the 10th embodiment of the present invention; and FIG. 23C is a timing chart showing an example of a driving voltage applied to another electrode according to the 10th embodiment of the present invention.

BEST MODE FOR CARRYING OUT THE INVENTION

First Embodiment

Figure 1:
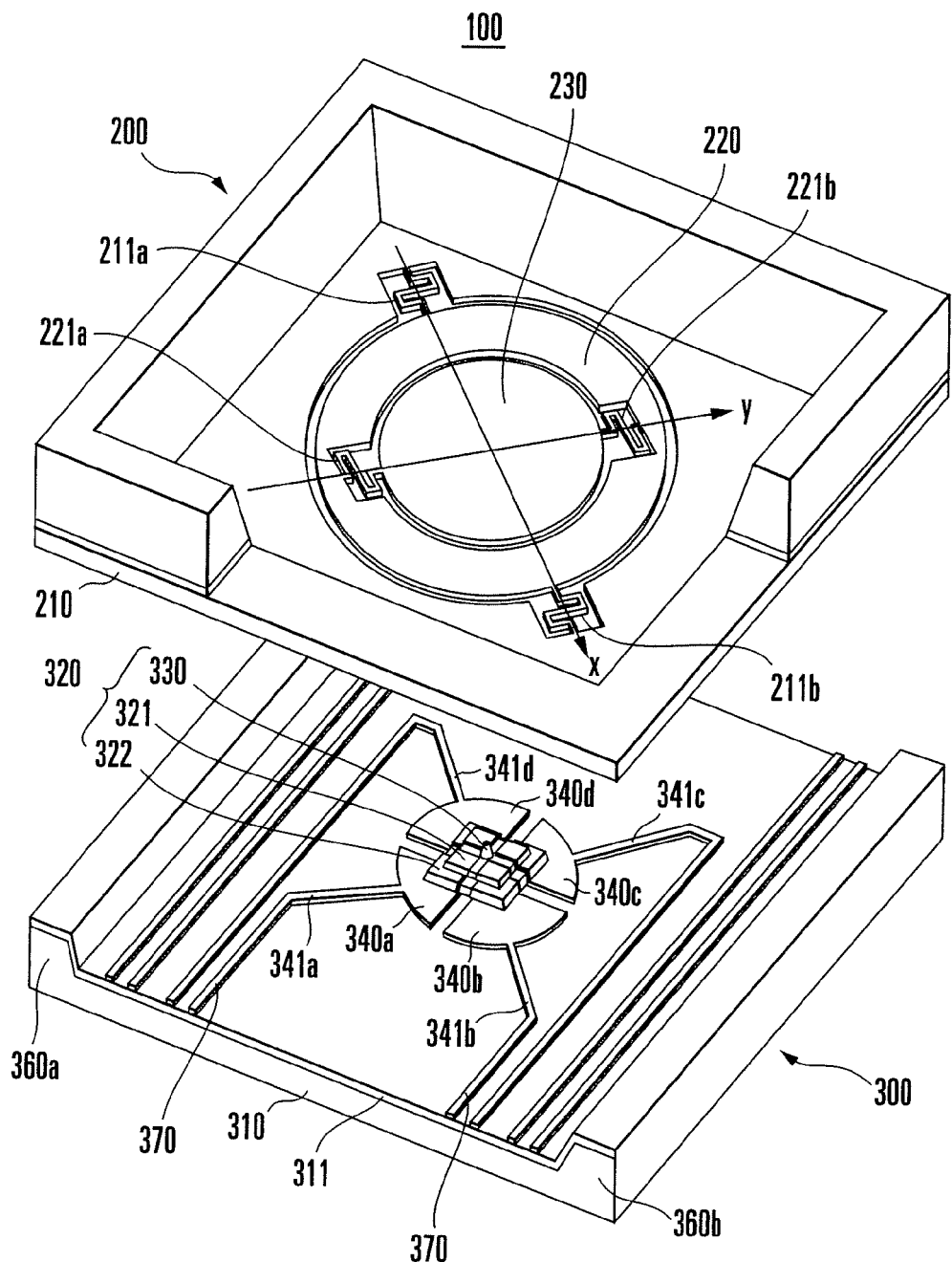
FIG. 1 is an exploded perspective view showing the arrangement of a mirror control device according to the first embodiment of the present invention.
Figure 2:
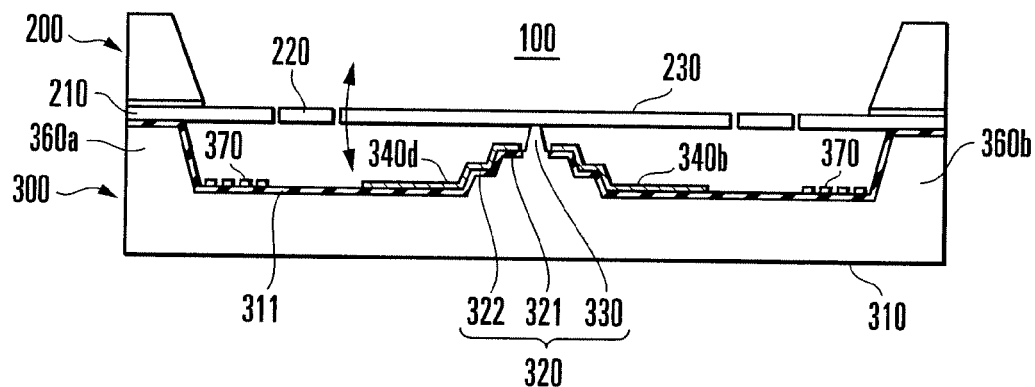
FIG. 2 is a sectional view of the mirror control device shown in FIG. 1.

An embodiment of the present invention will now be described with reference to the accompanying drawings. FIG. 1 is an exploded perspective view showing the arrangement of a mirror control device according to the first embodiment of the present invention. FIG. 2 is a sectional view of the mirror control device shown in FIG. 1. In a mirror control device 100, a mirror substrate (upper substrate) 200 having a mirror, and an electrode substrate (lower substrate) 300 having electrodes are arranged in parallel.

The mirror substrate 200 includes a plate-shaped frame portion 210 which has an opening with an almost circular shape viewed from the upper side, a gimbal 220 which has an opening with an almost circular shape viewed from the upper side and is arranged in the opening of the frame portion 210 via a pair of torsion springs 211a and 211b, and a mirror 230 which has an almost circular shape viewed from the upper side and is arranged in the opening of the gimbal 220 via a pair of torsion springs 221a and 221b. The frame portion 210, torsion springs 211a, 211b, 221a, and 221b, gimbal 220, and mirror 230 are integrally formed from, e.g., single-crystal silicon. For example, a Ti/Pt/Au layer having a three layer structure is formed on the surface of the mirror 230.

The pair of torsion springs 211a and 211b connect the frame portion 210 to the gimbal 220. The gimbal 220 can pivot about a gimbal pivot axis x in FIG. 1 which passes through the pair of torsion springs 211a and 211b.

Similarly, the pair of torsion springs 221a and 221b connect the gimbal 220 to the mirror 230. The mirror 230 can pivot about a mirror pivot axis y in FIG. 1 which passes through the pair of torsion springs 221a and 221b. The gimbal pivot axis x and the mirror pivot axis y are perpendicular to each other. As a result, the mirror 230 pivots about the two axes which are perpendicular to each other.

The electrode substrate 300 includes a plate-shaped base portion 310, and a terrace-shaped projecting portion 320 which projects from the surface (upper surface) of the base portion 310 at a position facing the mirror 230 of the mirror substrate 200. The base portion 310 and the projecting portion 320 are made of, e.g., single-crystal silicon. The projecting portion 320 includes a second terrace 322 having a truncated pyramidal shape and formed on the upper surface of the base portion 310, a first terrace 321 having a truncated pyramidal shape and formed on the upper surface of the second terrace 322, and a pivot 330 having a columnar shape and formed on the upper surface of the first terrace 321. The pivot 330 is formed almost at the center of the first terrace 321. Hence, the pivot 330 is located at a position facing the center of the mirror 230.

Four electrodes 340a to 340d are formed on the four corners of the projecting portion 320 and the upper surface of the base portion 310 led out of the four corners so as to be located in a circle concentric to the mirror 230 of the mirror substrate 200. A pair of projecting portions 360a and 360b are formed on the upper surface of the base portion 310 to be juxtaposed while sandwiching the projecting portion 320. Interconnections 370 are formed on the upper surface of the base portion 310 between the projecting portion 320 and the projecting portions 360a and 360b. The electrodes 340a to 340d are connected to the interconnections 370 via leads 341a to 341d.

The lower surface of the frame portion 210 and the upper surfaces of the projecting portions 360a and 360b are bonded to each other to make the mirror 230 face the electrodes 340a to 340d corresponding to the mirror 230 so that the mirror substrate 200 and the electrode substrate 300 form the mirror control device 100 shown in FIG. 2.

In the mirror control device 100, the mirror 230 is grounded. A positive voltage is applied to the electrodes 340a to 340d such that an asymmetrical potential difference is generated between them, thereby attracting the mirror 230 by an electrostatic attraction and making it pivot in an arbitrary direction.

As described above, the frame portion 210, torsion springs 211a, 211b, 221a, and 221b, gimbal 220, and mirror 230 are integrally made of a conductive material (single-crystal silicon in this embodiment).

An insulating layer 311 made of, e.g., silicon oxide is formed on the surface of the base portion 310 made of, e.g., single-crystal silicon. The electrodes 340a to 340d, leads 341a to 341d, and interconnections 370 are formed on the insulating layer 311.

The large difference between the mirror control device of this embodiment and that of the related art is as follows. In the conventional mirror control device, driving voltages to control the mirror 230 to a desired angle are applied to the electrodes 340a to 340d. In this embodiment, however, the voltages to be applied to the electrodes 340a to 340d are determined by combining (adding/subtracting or multiplying) the driving voltages of the respective electrodes and bias voltages independent of the tilt angle of the mirror 230. Additionally, the bias voltage of at least one electrode is different from that of the remaining electrodes.

Figure 3:
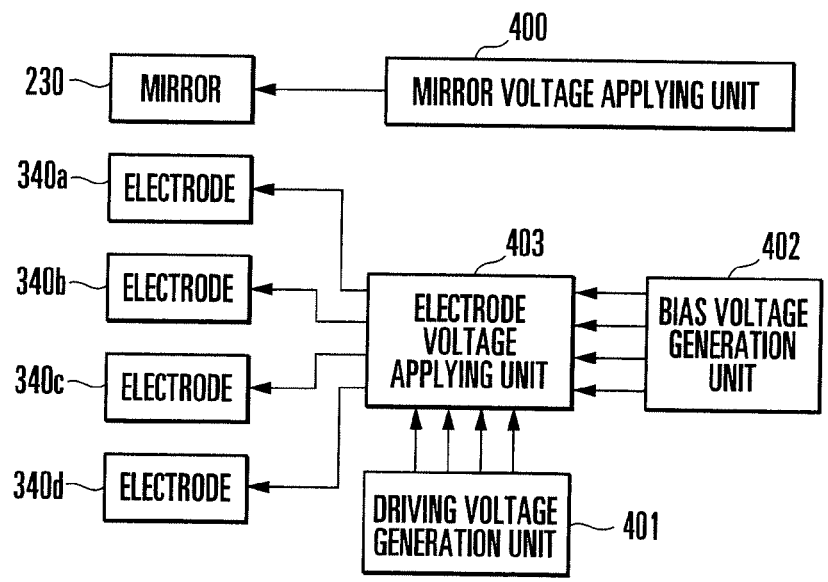
FIG. 3 is a block diagram showing the electrical connection relationship of the mirror control device according to the first embodiment of the present invention.

The difference between the mirror control device of this embodiment and that of the related art will be described in more detail. FIG. 3 is a block diagram showing the electrical connection relationship of the mirror control device according to this embodiment.

A mirror voltage applying unit 400 applies a ground potential to the mirror 230 via the frame portion 210, torsion springs 211a and 211b, gimbal 220, and torsion springs 221a and 221b.

A driving voltage generation unit 401 generates driving voltages corresponding to the desired tilt angle of the mirror 230 for the electrodes 340a to 340d. The driving voltage generation unit 401 incorporates a table in which the relationship between the driving voltages and the tilt angle of the mirror 230 is set in advance. The driving voltage generation unit 401 acquires driving voltage values corresponding to the desired tilt angle of the mirror 230 from the table and generates the driving voltages of the respective electrodes. The driving voltage vs. tilt angle characteristic of the mirror 230, which is used to set the table of the driving voltage generation unit 401, is an ideal characteristic obtained when the central position shift between the electrodes 340a to 340d and the mirror 230 and errors in the shapes of the electrodes 340a to 340d fall within predetermined ranges.

A bias voltage generation unit 402 generates, as the bias voltage of each electrode, a voltage which causes the tilt angle of the mirror 230 with respect to the mirror substrate 200 to have a predetermined absolute value upon being independently applied to each of the electrodes 340a to 340d.

Figure 4:
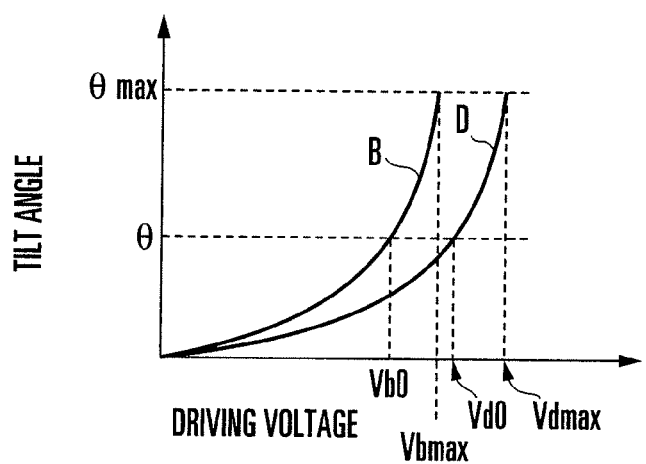
FIG. 4 is a graph showing an example of the driving voltage vs. tilt angle characteristic of a mirror according to the first embodiment of the present invention.
Figure 5:
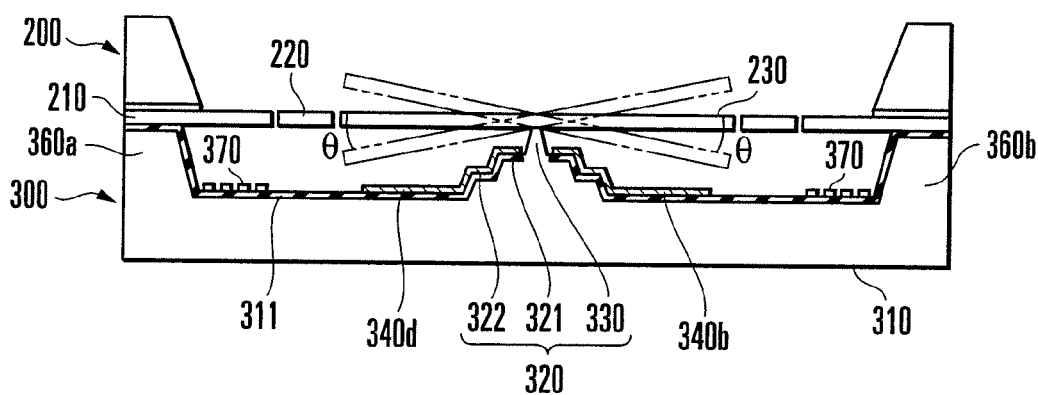
FIG. 5 is a sectional view showing a pivot of the mirror pivots according to the first embodiment of the present invention.

FIGS. 4 and 5 are views for explaining the operation of the bias voltage generation unit 402. FIG. 4 is a graph showing an example of the driving voltage vs. tilt angle characteristic of the mirror 230. FIG. 5 is a sectional view showing a pivot of the mirror 230. An example will be described here in which the mirror 230 pivots about the mirror pivot axis y in FIG. 1.

Referring to FIG. 4, B represents the driving voltage vs. tilt angle characteristic of the mirror 230 upon applying a driving voltage to only the electrode 340b, and D represents the driving voltage vs. tilt angle characteristic of the mirror 230 upon applying a driving voltage to only the electrode 340d. The tilt angle of the mirror 230 when a driving voltage is applied to only the electrode 340b is opposite to that when a driving voltage is applied to only the electrode 340d. However, the absolute values of the tilt angles are compared in FIG. 4.

A voltage is applied to the electrode 340b to make the mirror 230 pivot toward the electrode 340b, as indicated by the broken line in FIG. 5. At this time, when the voltage is Vb0, the tilt angle of the mirror 230 has a predetermined value θ, as is apparent from FIG. 4. Similarly, a voltage is applied to the electrode 340d to make the mirror 230 pivot toward the electrode 340d, as indicated by the alternate long and short dashed line in FIG. 5. At this time, when the voltage is Vd0, the tilt angle of the mirror 230 has the predetermined value θ, as is apparent from FIG. 4.

The values of the bias voltages Vb0 and Vd0 are registered in the bias voltage generation unit 402 in advance. To make the mirror 230 pivot about the mirror pivot axis y, the bias voltage generation unit 402 generates Vb0 as the bias voltage to be applied to the electrode 340b and Vd0 as the bias voltage to be applied to the electrode 340d. The bias voltage generation unit 402 thus generates the bias voltages for the respective electrodes concerned in the driving of the mirror 230.

The bias voltages do not depend on the tilt angle of the mirror 230. They are unique and fixed to the respective electrodes. The electrodes 340a and 340c are concerned in the pivot of the mirror 230 about the gimbal pivot axis x but not in the pivot about the mirror pivot axis y. To make the mirror 230 pivot about the mirror pivot axis y, only the bias voltages generated by the bias voltage generation unit 402 are applied to the electrodes 340a and 340c. Similarly, to make the mirror 230 pivot about the gimbal pivot axis x, only the bias voltages are applied to the electrodes 340b and 340d.

An electrode voltage applying unit 403 adds, for each electrode, a bias voltage generated by the bias voltage generation unit 402 to a driving voltage generated by the driving voltage generation unit 401, and applies the voltage after addition to a corresponding one of the electrodes 340a to 340d. The voltages are applied to the electrodes 340a to 340d via the leads 341a to 341d, respectively. This makes the mirror 230 pivot in a direction corresponding to the potential differences between the electrodes 340a to 340d.

In this embodiment, a voltage which causes the tilt angle of the mirror 230 to have the same predetermined value θ upon being independently applied to each of the electrodes 340a to 340d is generated as the bias voltage, thereby reducing a difference in the driving voltage vs. tilt angle characteristic depending on the pivot direction of the mirror 230. Consequently, in this embodiment, it is unnecessary to consider a change in the driving voltage vs. tilt angle characteristic depending on the pivot direction of the mirror 230 when generating the driving voltages.

The bias voltage may be generated by multiplying the voltage at which the tilt angle of the mirror 230 has the same predetermined value θ by a coefficient. For example, the predetermined value θ is defined as the maximum angle to be used, and the bias voltage is defined as ½ of a voltage at which the tilt angle of the mirror 230 has the predetermined value θ. This allows to set a bias voltage capable of improving the linearity in the overall range of use angles of the mirror 230.

In this embodiment, a voltage at which the tilt angle of the mirror 230 has the same predetermined value θ is generated as the bias voltage. However, the predetermined value θ may change depending on the electrode. The predetermined value θ is determined by the use angle range. For example, if the use tilt angle of the mirror 230 about the axis x is different from the use tilt angle of the mirror 230 about the axis y, different values are used as the predetermined value θ when determining the bias voltage of each electrode concerned in the pivot of the mirror 230 about the axis x and the predetermined value θ when determining the bias voltage of each electrode concerned in the pivot of the mirror 230 about the axis y, thereby setting bias voltages suitable for the respective pivots. If the use angle in the + direction and that in the − direction are different concerning the pivot about the same axis x, the predetermined value θ changes depending on the direction.

Second Embodiment

The second embodiment of the present invention will be described next. In the first embodiment, the bias voltage is determined based on the data of a specific point on the driving voltage vs. tilt angle characteristic of the mirror 230. However, this determination method cannot reducing a difference in the driving voltage vs. tilt angle characteristic depending on the pivot direction of the mirror 230 in a wide driving voltage (tilt angle) range. This is because the gradient of each driving voltage vs. tilt angle characteristic of the mirror 230 changes, as shown in FIG. 4. In the second embodiment, a bias voltage determination method that is effective in a wider range than in the first embodiment will be explained.

A mirror control device of the second embodiment has the same arrangement as that of the first embodiment. The operation of the second embodiment will be described using the reference numerals in FIGS. 1 to 3.

The operations of a mirror voltage applying unit 400, driving voltage generation unit 401, and bias voltage generation unit 402 are the same as in the first embodiment.

An electrode voltage applying unit 403 of the second embodiment adds, for each electrode, a bias voltage generated by the bias voltage generation unit 402 to a driving voltage generated by the driving voltage generation unit 401, as in the first embodiment. At this time, the electrode voltage applying unit 403 multiplies the driving voltages for the respective electrodes before addition by different coefficients. Let Vy be the driving voltage for an electrode 340b, which is generated by the driving voltage generation unit 401, and −Vy be the driving voltage for an electrode 340d. An example will be described in which a mirror 230 pivots about a mirror pivot axis y. Voltages Vb and Vd after addition which are to be applied to the electrodes 340b and 340d, respectively, by the electrode voltage applying unit 403 are given by $$Vb = Vb0 + Vy \times (Vb\max - Vb0) \times (1/Vy\max) \quad (1)$$

$$Vd = Vd0 - Vy \times (Vd\max - Vd0) \times (1/Vy\max) \quad (2)$$

where Vbmax is the voltage when the tilt angle of the mirror 230 has reached a maximum value θmax (θ<θmax) on a driving voltage vs. tilt angle characteristic B shown in FIG. 4, Vdmax is the voltage when the tilt angle of the mirror 230 has reached the maximum value θmax on a driving voltage vs. tilt angle characteristic D shown in FIG. 4, and Vymax is the maximum value of the driving voltage Vy. That is, the driving voltage Vy can take a value within the range of 0 to Vymax. The value θmax represents the maximum tilt angle necessary for the mirror 230.

The electrode voltage applying unit 403 multiplies the driving voltage Vy by the preset coefficient (Vbmax−Vb0)×

(1/Vymax) and adds the multiplication result to the bias voltage Vb0, as indicated by equation (1), and applies the voltage Vb after addition to the electrode 340b. The electrode voltage applying unit 403 also multiplies the driving voltage −Vy by the preset coefficient (Vdmax−Vd0)×(1/Vymax) and adds the multiplication result to the bias voltage Vd0, as indicated by equation (2), and applies the voltage Vd after addition to the electrode 340d. This makes the mirror 230 pivot in a direction corresponding to the potential differences between the electrodes 340a to 340d.

In this embodiment, the driving voltage of each electrode is corrected based on the tilt, between two points, of the driving voltage vs. tilt angle characteristic of the mirror 230 for the electrode (the tilt (Vbmax−Vb0) or (Vdmax−Vd0) between the tilt angles θ and θmax in this embodiment). This enables to make the driving voltage vs. tilt angle characteristics of the mirror 230 in the respective pivot directions apparently even between the two points corresponding to the tilt angles θ and θmax. It is therefore possible to reducing a difference in the driving voltage vs. tilt angle characteristic depending on the pivot direction of the mirror 230 in a wider driving voltage (tilt angle) range than in the first embodiment.

In this embodiment, the pivot of the mirror 230 about the mirror pivot axis y has been described. To make the mirror 230 pivot about the gimbal pivot axis x, the same correction as in equations (1) and (2) is performed for the voltages to be applied to the electrodes 340a and 340c. To make the mirror 230 pivot about the axes x and y, the same correction as in equations (1) and (2) is performed for the voltages to be applied to the electrodes 340a to 340d.

In the first and second embodiments, a case has mainly been described in which, for example, the driving voltage vs. tilt angle characteristic of the mirror 230 changes between the pivot about one axis to the right side in FIG. 2 and that to the left side. The driving voltage vs. tilt angle characteristic in the pivot about one axis changes due to, e.g., the central position shift between the electrodes 340a to 340d and the mirror 230 or errors in the shapes of the electrodes 340a to 340d.

The characteristic also changes depending on the pivot direction of the mirror 230 because of, e.g., the difference in the driving voltage vs. tilt angle characteristic of the mirror 230 between the pivot about the gimbal pivot axis x and that about the mirror pivot axis y. This occurs due to, e.g., the stiffness difference between torsion springs 211a and 211b about the pivot axis x and torsion springs 221a and 221b about the pivot axis y. In this case, the bias voltage and the coefficient are changed between the electrodes 340a and 340c which are arranged symmetrically with respect to a plane including the pivot axis x and perpendicular to a base portion 310 and the electrodes 340b and 340d which are arranged symmetrically with respect to a plane including the pivot axis y and perpendicular to the base portion 310.

Third Embodiment

The third embodiment of the present invention will be described next. A mirror control device of the third embodiment has the same mechanical arrangement as that of the first embodiment and will be described using the reference numerals in FIGS. 1 and 2.

Figure 6:
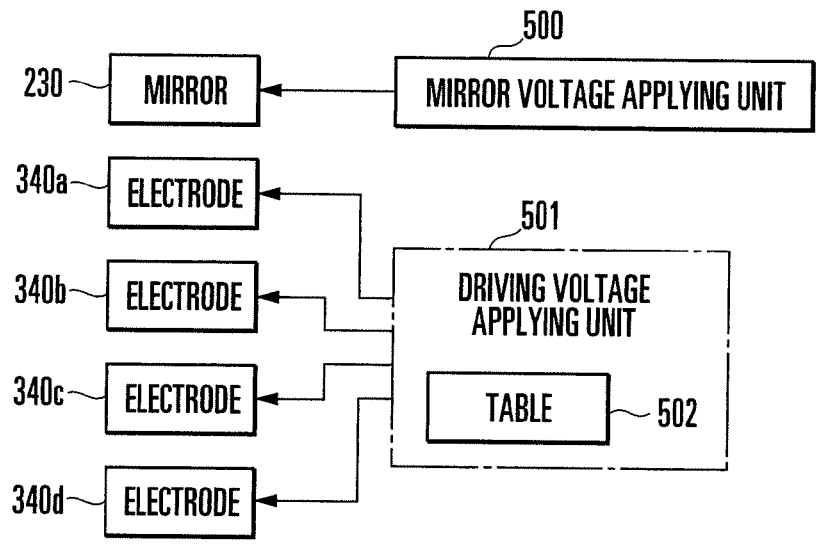
FIG. 6 is a block diagram showing the electrical connection relationship of a mirror control device according to the third embodiment of the present invention.

The large difference between the mirror control device of this embodiment and that of the related art is as follows. In the conventional mirror control device, DC driving voltages are applied to the electrodes 340a to 340d. In this embodiment, however, AC voltages whose average DC component is almost zero are applied to electrodes 340a to 340d as driving voltages. The large difference between the mirror control device of this embodiment and that of the related art will be explained below in more detail. FIG. 6 is a block diagram showing the electrical connection relationship of the mirror control device according to this embodiment.

A mirror voltage applying unit 500 applies a ground potential to a mirror 230 via a frame portion 210, torsion springs 211a and 211b, gimbal 220, and torsion springs 221a and 221b.

A driving voltage applying unit 501 generates AC voltages, whose average DC component is almost zero for each of the electrodes 340a to 340d, as driving voltages in accordance with the desired tilt angle of the mirror 230 and applies the voltages to the electrodes 340a to 340d. The driving voltages are applied to the electrodes 340a to 340d via leads 341a to 341d, respectively. This makes the mirror 230 pivot in a direction corresponding to the potential differences between the electrodes 340a to 340d.

The electrostatic attraction serving as the driving force of the mirror 230 is proportional to the square of a driving voltage. For this reason, the electrostatic attraction does not change depending on the sign of the driving voltage. More specifically, even when rectangular voltages having alternately changing signs and the same magnitudes as DC voltages are applied to the electrodes 340a to 340d as the driving voltages, the same electrostatic attraction as that upon applying the DC voltages to the electrodes 340a to 340d is generated between the mirror 230 and the electrodes 340a to 340d.

Figure 7A:
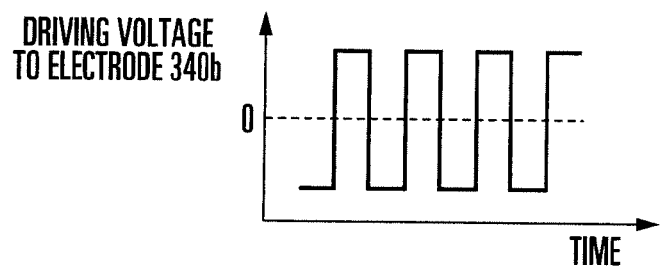
FIG. 7A is a timing chart showing an example of a driving voltage applied to one electrode according to the third embodiment of the present invention.
Figure 7B:
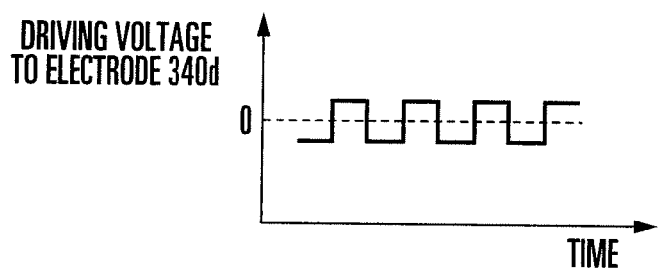
FIG. 7B is a timing chart showing an example of a driving voltage applied to another electrode according to the third embodiment of the present invention.

FIG. 7A is a timing chart showing an example of a driving voltage applied to the electrode 340b. FIG. 7B is a timing chart showing an example of a driving voltage applied to the electrode 340d. A section where the potential difference between the mirror 230 and the electrode to which the driving voltage is applied is positive will be called a first section (a section where a positive driving voltage is applied in each of the examples shown in FIGS. 7A and 7B). A section where the potential difference is negative will be called a second section (a section where a negative driving voltage is applied in each of the examples shown in FIGS. 7A and 7B).

In the examples shown in FIGS. 7A and 7B, AC voltages having the same phase and same voltage applying duration but different amplitudes are applied to the electrodes 340b and 340d. Since the AC voltage applied to the electrode 340b has a larger amplitude, the electrostatic force between the mirror 230 and the electrode 340b is different from that between the mirror 230 and the electrode 340d. The mirror 230 pivots about a mirror pivot axis y toward the side of the electrode 340b. Assume that the frequency response of the mirror 230 is ideal (the tilt angle of the mirror does not change between driving by a DC voltage and driving by a rectangular wave), and let Vb be the amplitude of the rectangular wave shown in FIG. 7A (the wave oscillates in the range of −Vb to +Vb), and Vd be the amplitude of the rectangular wave shown in FIG. 7B (the wave oscillates in the range of −Vd to +Vd). In this case, the tilt angle of the mirror 230 when the driving voltage in FIG. 7A is applied to the electrode 340b, and the driving voltage in FIG. 7B is applied to the electrode 340d is the same as the tilt angle when a DC voltage Vb (or −Vb) is applied to the electrode 340b, and a DC voltage Vd (or −Vd) is applied to the electrode 340d.

On the other hand, the sign of charges accumulated in the stray capacitance (e.g., insulating layer 311) due to the driving voltages applied to the electrodes 340a to 340d changes depending on the sign of the driving voltages. Hence, when AC voltages whose average DC component is almost zero (AC voltages having almost the same positive/negative voltage applying duration and almost the same positive/negative amplitude) for each of the electrodes 340a to 340d are applied to the electrodes 340a to 340d as the driving voltages, positive and negative charges accumulated in the stray capacitance cancel each other in accordance with the AC voltages. For this reason, the charges accumulated in the stray capacitance are almost zero on average. In this embodiment, it is consequently possible to suppress drift of the mirror 230 caused by the charges accumulated in the stray capacitance.

When the amplitude of a driving voltage to be applied to an electrode is changed, as in this embodiment, the relationship between the amplitude of the driving voltage and the tilt angle of the mirror 230 exhibits almost the same characteristic as that when the driving voltage is a DC voltage. Hence, the tilt angle of the mirror 230 is preferably controlled by the same method as the method used when the driving voltage is a DC voltage.

Let Va, Vb, Vc, and Vd be the amplitudes of the driving voltages applied to the electrodes 340a, 340b, 340c, and 340d. The driving voltages are given by $$Va = Vo + Vx \quad (3)$$

$$Vb = Vo + Vy \quad (4)$$

$$Vc = Vo - Vx \quad (5)$$

$$Vd = Vo - Vy \quad (6)$$

where Vo is a bias voltage having a fixed value. The bias voltage Vo has an effect of improving the linearity between the amplitude of the driving voltage and the tilt angle of the mirror 230. Vx is an operation variable corresponding to a tilt angle θx of the mirror 230 about the pivot axis x in a one-to-one correspondence. Vy is an operation variable corresponding to a tilt angle θy of the mirror 230 about the pivot axis y in a one-to-one correspondence. The mirror 230 can be made to pivot in an arbitrary direction by controlling the operation variables Vx and Vy.

When actually controlling the mirror 230, the driving voltage applying unit 501 performs the following processing. The driving voltage applying unit 501 incorporates a table 502 in which the relationship between the tilt angle of the mirror 230 and the amplitude and duty ratio (the duty ratio is constant in this embodiment) of the driving voltage is set in advance. The driving voltage applying unit 501 acquires the values of the amplitudes and duty ratios of driving voltages corresponding to the desired tilt angle of the mirror 230 from the table 502 and applies the driving voltages having the acquired amplitudes and duty ratios to the electrodes 340a to 340d.

Fourth Embodiment

The fourth embodiment of the present invention will be described next. In the third embodiment, the tilt angle of the mirror 230 is controlled based on the amplitude of an AC voltage. However, the tilt angle of the mirror 230 may be controlled based on the duty ratio of an AC voltage. A mirror control device of the fourth embodiment has the same arrangement as that of the third embodiment. The operation of the fourth embodiment will be described using the reference numerals in FIGS. 1, 2, and 6.

Figure 8A:
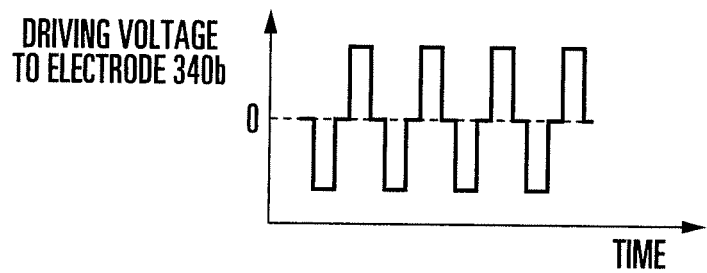
FIG. 8A is a timing chart showing an example of a driving voltage applied to one electrode according to the fourth embodiment of the present invention.
Figure 8B:
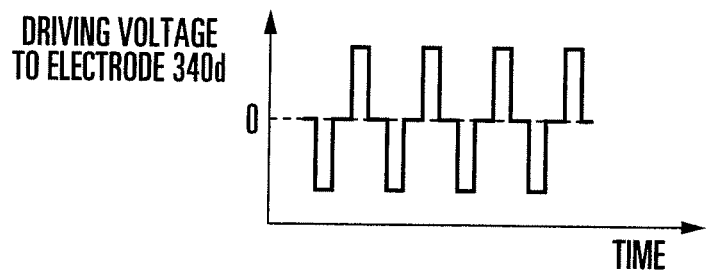
FIG. 8B is a timing chart showing an example of a driving voltage applied to another electrode according to the fourth embodiment of the present invention.

FIG. 8A is a timing chart showing an example of a driving voltage applied to an electrode 340b. FIG. 8B is a timing chart showing an example of a driving voltage applied to an electrode 340d. A section where the potential difference between a mirror 230 and the electrode to which the driving voltage is applied is positive will be called a first section (a section where a positive driving voltage is applied in each of the examples shown in FIGS. 8A and 8B). A section where the potential difference is negative will be called a second section (a section where a negative driving voltage is applied in each of the examples shown in FIGS. 8A and 8B). A section where the potential difference is a potential between the potential difference in the first section and that in the second section will be called a third section (a section where the driving voltage is 0 in each of the examples shown in FIGS. 8A and 8B).

A driving voltage applying unit 501 of this embodiment generates AC voltages, whose average DC component is almost zero for each of the electrodes 340a to 340d, as driving voltages in accordance with the desired tilt angle of the mirror 230 and applies the voltages to the electrodes 340a to 340d, as in the third embodiment. For example, AC voltages having the same phase and same amplitude but different duty ratios (the ratio of a positive/negative voltage width with respect to the period of an AC voltage) are applied to the electrodes 340b and 340d, as shown in FIGS. 8A and 8B.

The driving voltage applying unit 501 incorporates a table 502 in which the relationship between the tilt angle of the mirror 230 and the duty ratio and amplitude (the amplitude is constant in this embodiment) of the driving voltage is set in advance. The driving voltage applying unit 501 acquires the values of the duty ratios and amplitudes of driving voltages corresponding to the desired tilt angle of the mirror 230 from the table 502 and applies the driving voltages having the acquired amplitudes and duty ratios to the electrodes 340a to 340d. In the examples shown in FIGS. 8A and 8B, since the AC voltage applied to the electrode 340b has a higher duty ratio, the electrostatic force between the mirror 230 and the electrode 340b is different from that between the mirror 230 and the electrode 340d. The mirror 230 pivots about a mirror pivot axis y toward the side of the electrode 340b.

In the fourth embodiment, the same effect as in the third embodiment can be obtained in this way.

Figure 9:
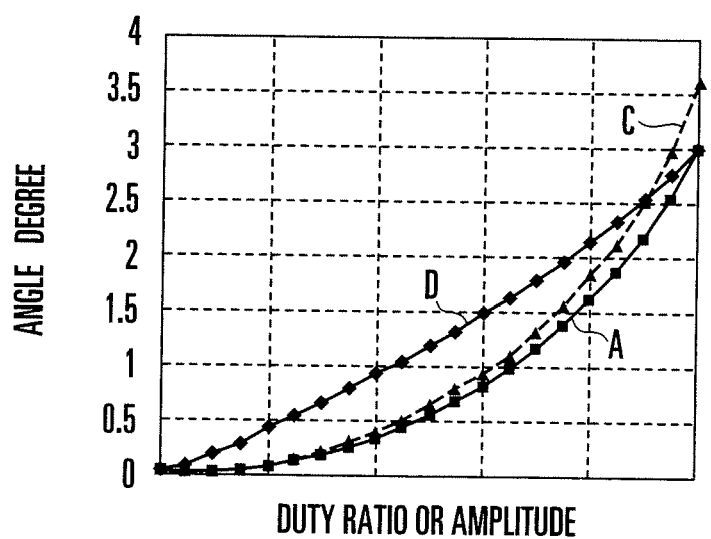
FIG. 9 is a graph for explaining the effect of the fourth embodiment of the present invention.

FIG. 9 is a graph for explaining the effect of this embodiment. FIG. 9 shows an actual measurement example representing the relationship between the tilt angle of the mirror 230 and the ratio of the amplitude of the driving voltage with respect to the maximum amplitude upon controlling the amplitude of the driving voltage, as in the third embodiment, when applying rectangular waves to the electrodes 340a to 340d as the driving voltages, and the relationship between the tilt angle of the mirror 230 and the ratio of the pulse width of the driving voltage with respect to the maximum pulse width upon controlling the duty ratio of the driving voltage, as in this embodiment. Referring to FIG. 9, A represents a characteristic when controlling the amplitude of the driving voltage, D represents a characteristic when controlling the duty ratio of the driving voltage, and C represents a characteristic when controlling using a DC voltage.

As is apparent from FIG. 9, when the amplitude of the driving voltage is controlled, as in the third embodiment, the tilt angle of the mirror 230 changes nonlinearly with respect to the ratio of the amplitude of the driving voltage. This means that tilt angle control of the mirror 230 is difficult. On the other hand, when the duty ratio of the driving voltage is controlled, as in this embodiment, the tilt angle of the mirror 230 changes almost linearly with respect to the ratio of the pulse width of the driving voltage. According to this embodiment, it is possible to more easily control the tilt angle of the mirror 230 as compared to the third embodiment or the related art which employs control by a DC driving voltage.

A method of controlling the tilt angle of the mirror 230 according to this embodiment will be described next. In this embodiment, the tilt angle of the mirror 230 is controlled based on the duty ratios of driving voltages to be applied to the electrodes. Let PWa, PWb, PWc, and PWd be the pulse widths of the driving voltages to be applied to the electrodes 340a, 340b, 340c, and 340d, respectively. PWa, PWb, PWc, and PWd range from 0 to 1. When the pulse width is 0, no voltage is output. A pulse width of 1 indicates a rectangular wave having a duty ratio of 50%.

Figure 10A:
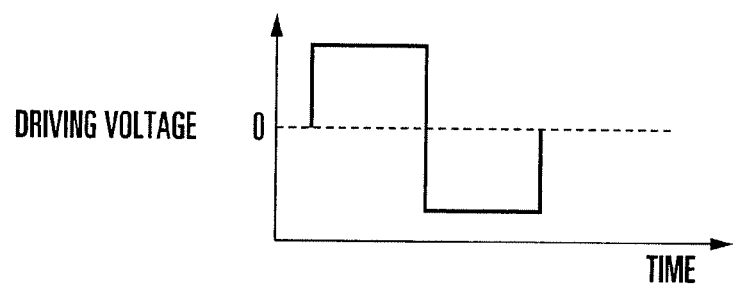
FIGS. 10A to 10C are timing charts for explaining a method of controlling the tilt angle of a mirror according to the fourth embodiment of the present invention.
Figure 10B:
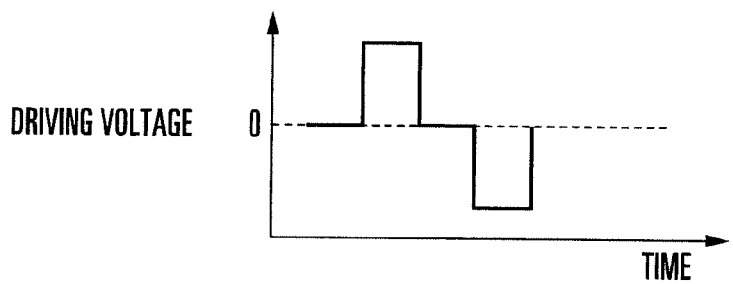
Figure 10C:
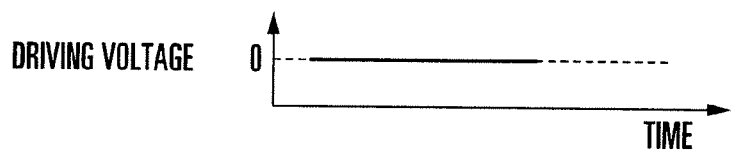

FIG. 10A is a timing chart showing a driving voltage applied to the electrode 340a when PWa=1. FIG. 10B is a timing chart showing a driving voltage applied to the electrode 340a when PWa=0.5. FIG. 10C is a timing chart showing a driving voltage applied to the electrode 340a when PWa=0. The pulse widths PWa, PWb, PWc, and PWd of the driving voltages are given by, e.g., $$PWa = PWo + PWx \quad (7)$$

$$PWb = PWo + PWy \quad (8)$$

$$PWc = PWo - PWx \quad (9)$$

$$PWd = PWo - PWy \quad (10)$$

where PWo is a bias pulse width having a fixed value. The bias pulse width PWo has an effect of improving the linearity between the pulse width of the driving voltage and the tilt angle of the mirror 230. PWx is an operation variable corresponding to a tilt angle θx of the mirror 230 about a pivot axis x in a one-to-one correspondence. PWy is an operation variable corresponding to a tilt angle θy of the mirror 230 about the pivot axis y in a one-to-one correspondence. The mirror 230 can be made to pivot in an arbitrary direction by controlling the operation variables PWx and PWy.

However, as described with reference to FIG. 9, when the duty ratio of the driving voltage is controlled, the linearity between the pulse width of the driving voltage and the tilt angle of the mirror 230 is high. Hence, the pulse width of the driving voltage may be controlled only for an electrode in the direction in which the mirror 230 approaches the electrode for each axis. In this case, the pulse widths PWa, PWb, PWc, and PWd of the driving voltages are given by $$PWa = PWx (PWx > 0) \quad (11)$$

$$PWa = 0 (PWx \leq 0) \quad (12)$$

$$PWb = PWy (PWy > 0) \quad (13)$$

$$PWb = 0 (PWy \leq 0) \quad (14)$$

$$PWc = PWx (PWx < 0) \quad (15)$$

$$PWc = 0 (PWx \geq 0) \quad (16)$$

$$PWd = PWy (PWy < 0) \quad (17)$$

$$PWd = 0 (PWy \leq 0) \quad (18)$$

As described above, in this embodiment, the ratio of the sum of the time widths in the first and second sections to the time width in the third section is changed in accordance with the tilt angle of the mirror 230. When actually controlling the mirror 230, the driving voltage applying unit 501 performs the following processing. The driving voltage applying unit 501 acquires the values of the pulse widths and amplitudes (the amplitude is constant in this embodiment) of driving voltages corresponding to the desired tilt angle of the mirror 230 from the table 502 and applies the driving voltages having the acquired pulse widths and amplitudes to the electrodes 340a to 340d.

In the third and fourth embodiments, each of the AC voltages to be applied to the electrodes 340a to 340d is preferably a rectangular wave because it can increase the force for driving the mirror 230. However, a sine wave or a triangular wave except a rectangular wave is also usable.

As described above, the mirror 230 is driven by an electrostatic attraction which is proportional to the square of a driving voltage. For this reason, if an AC voltage having a rectangular waveform is used as a driving voltage, the same driving as that using a DC voltage is ideally performed.

Figure 11A:
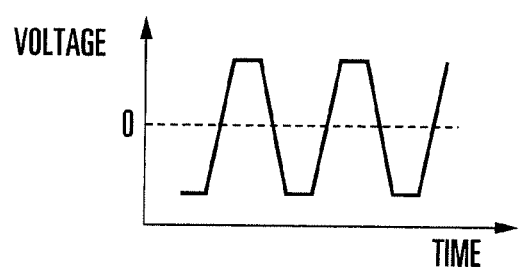
FIGS. 11A and 11B are timing charts for explaining a problem when using an AC voltage as a driving voltage in the third and fourth embodiments of the present invention.
Figure 11B:
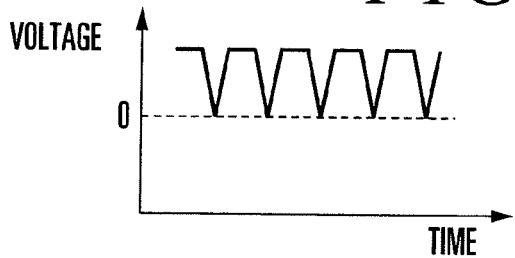

However, the actual driving voltage has a trapezoidal shape as shown in FIG. 11A because of the limitation of the slew rate of a voltage amplifier used in the driving voltage applying unit 501. Regarding the force for driving the mirror 230, this is equivalent to a driving voltage having a waveform as shown in FIG. 11B. Hence, when an AC voltage having a rectangular waveform is used as a driving voltage, points at which the force is zero (points where the voltage decreases to zero in FIG. 11B) are generated at a period twice the AC voltage in the electrostatic attraction for driving the mirror 230. If the mirror 230 responds to the periodical decrease in the electrostatic attraction, the mirror 230 vibrates.

To prevent the vibration of the mirror 230, the frequency of the AC voltage to be applied to each of the electrodes 340a to 340d as a driving voltage is made higher than the resonance frequency of the mirror 230.

Figure 12:
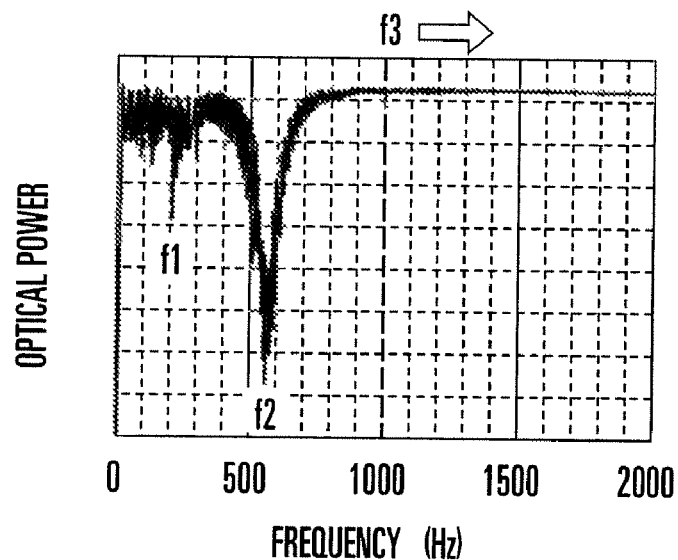
FIG. 12 is a graph showing the relationship between the power of output light and the frequency of a driving voltage when the paths between the input and output ports are connected in an optical switch.

FIG. 12 shows an actual measurement example representing the relationship between the power of output light and the frequency of the driving voltage of the mirror control device when the paths between the input and output ports are connected in an optical switch using the mirror control device according to the third or fourth embodiment. Referring to FIG. 12, f3 represents the lower limit value of the usable frequency of the driving voltage of the mirror control device.

In the optical switch, a mirror array including a plurality of mirror control devices two-dimensionally arrayed is provided between the input ports and the output ports, and the tilt angle of the mirror 230 of each mirror control device is appropriately controlled. This makes it possible to cause each mirror 230 to reflect light output from an input port and input the light to an arbitrary output port. It is therefore possible to connect arbitrary input and output ports.

In the example shown in FIG. 12, the mirror 230 has two resonance frequencies. i.e., f1 near 200 Hz and f2 near 550 Hz. The mirror 230 has two resonance frequencies because it has a resonance point for each of the pivot about the pivot axis x and the pivot about the pivot axis y. As described above, the mirror 230 vibrates near the resonance frequencies f1 and f2 in accordance with the driving voltage. Since this makes it difficult to input light reflected by the mirror 230 to an output port, the power of the output light that enters the output port largely decreases. When the frequency of the driving voltage is set to, e.g., a value (about 1 kHz in the example in FIG. 12) twice or more of the highest resonance frequency f2 of the mirror 230, the mirror 230 does not respond to the periodical decrease in the electrostatic attraction and hardly vibrates. It is therefore possible to prevent the decrease in the power of output light caused by the vibration of the mirror 230. In the third and fourth embodiments, the time width of each of the first, second, and third sections is set to be shorter than the reciprocal of the resonance frequency of the tilting motion of the mirror 230.

In the third and fourth embodiments, an example has been described in which the driving voltages are applied to the electrodes 340b and 340d. The electrodes to which the driving voltages should be applied are determined depending on the pivot direction of the mirror 230. Hence, the manner the driving voltages are applied is not limited the examples shown in FIGS. 7A, 7B, 8A, and 8B.

Both the amplitude and duty ratio of a driving voltage may be changed in accordance with the desired tilt angle of the mirror 230 by combining the third and fourth embodiments.

Fifth Embodiment

The fifth embodiment of the present invention will be described next. A mirror control device of the fifth embodiment has the same arrangement as that of the third embodiment. The operation of the fifth embodiment will be described using the reference numerals in FIGS. 1, 2, and 6. In the fourth embodiment, the tilt angle of the mirror 230 is adjusted by adjusting the duty ratios of the driving voltages to be applied to the electrodes 340a to 340d.

Figure 13A:
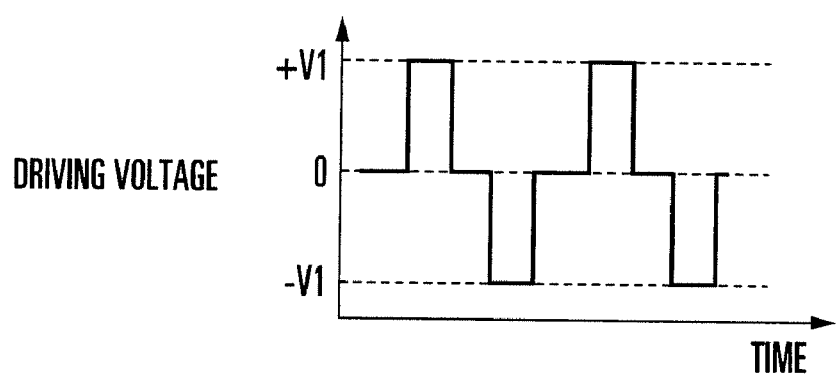
FIG. 13A is a timing chart showing an example of a driving voltage applied to one electrode according to the fourth embodiment of the present invention.
Figure 13B:
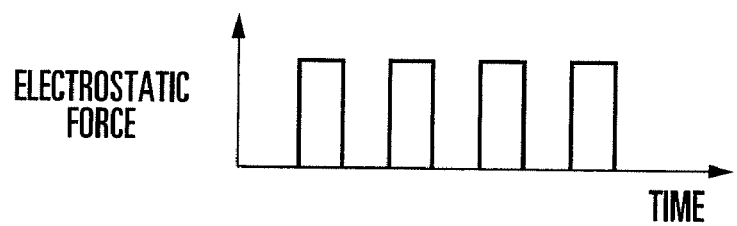
FIG. 13B is a timing chart showing an electrostatic force generated between the mirror and the electrode to which the driving voltage in FIG. 13A is applied.

FIG. 13A is a timing chart showing an example of a driving voltage applied to one of the electrodes 340a to 340d according to the fourth embodiment. FIG. 13B is a timing chart showing an electrostatic force generated between the mirror 230 and the electrode to which the driving voltage in FIG. 13A is applied. As described in the third and fourth embodiments, a ground potential is applied to the mirror 230.

A section where the potential difference between the mirror 230 and the electrode to which the driving voltage is applied is positive will be called a first section (a section where a driving voltage +V1 is applied in the example shown in FIG. 13A). A section where the potential difference is negative will be called a second section (a section where a driving voltage −V1 is applied in the example shown in FIG. 13A). A section where the potential difference is a potential between the potential difference in the first section and that in the second section will be called a third section (a section where the driving voltage is 0 in the example shown in FIG. 13A).

In FIG. 13A, the driving voltage applied to the electrode has a waveform which periodically repeats three voltage values +V1, 0, and −V1. The electrostatic force generated between the electrode and the mirror 230 is proportional to the square of the driving voltage. For this reason, in the first and second sections where the driving voltage +V1 or −V1 is applied, the electrostatic force increased by floating charges upon applying one of the driving voltage +V1 or −V1 and the electrostatic force decreased by floating charges upon applying the other driving voltage can be regarded as almost equal. Hence, in the first and second sections, it is possible to eliminate the influence of floating charges in, e.g., an insulating layer 311.

Figure 14A:
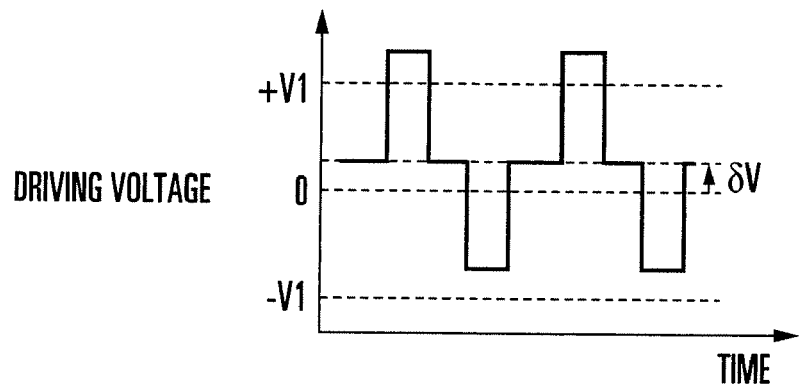
FIG. 14A is a timing chart showing an increase in a driving voltage due to floating charges.
Figure 14B:
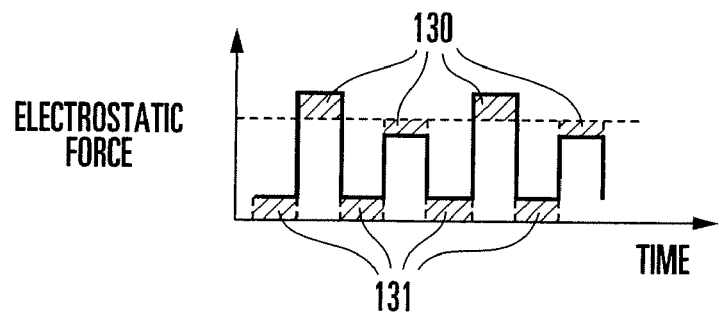
FIG. 14B is a timing chart showing an electrostatic force generated between the mirror and the electrode to which the driving voltage in FIG. 14A is applied.

However, when the driving voltage is 0, no charges to cancel exist. For this reason, the driving voltage varies from the value shown in FIG. 13A to the value shown in FIG. 14A. Referring to FIG. 14A, δV is a voltage obtained by converting the electrostatic force by floating charges into an increase amount of the driving voltage. As a result, the electrostatic force generated between the electrode and the mirror 230 change to that shown in FIG. 14B. In FIG. 14B, a hatched portion 130 indicates a portion where the influence of floating charges is removed. A hatched portion 131 indicates a portion where the influence of floating charges remains. That is, in the fourth embodiment, drift of the mirror 230 may occur although it is smaller than in an arrangement that applies DC voltages to the electrodes 340a to 340d. The reason of drift is supposed to be the existence of the time when the driving voltage is 0.

Figure 15:
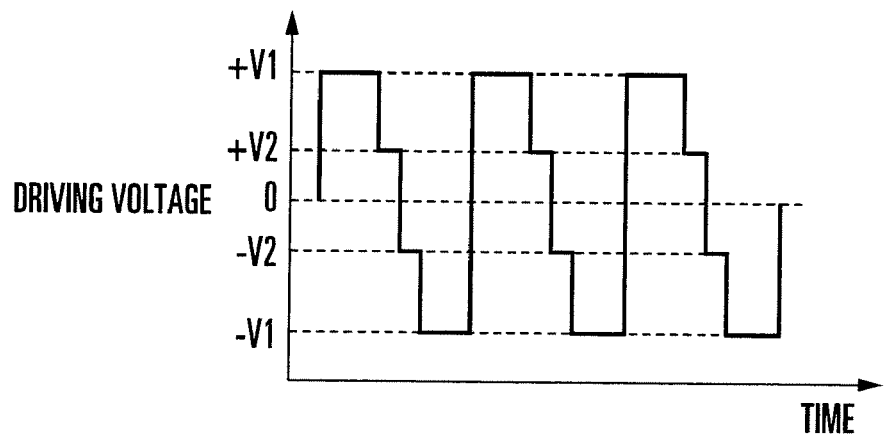
FIG. 15 is a timing chart showing an example of a driving voltage applied to one electrode according to the fifth embodiment of the present invention.

A driving voltage applying unit 501 of the fifth embodiment generates an AC voltage as shown in FIG. 15 for each of electrodes 340a to 340d in accordance with the desired tilt angle of the mirror 230 and applies the voltage to each electrode. FIG. 15 shows an example of a driving voltage applied to one of the electrodes 340a to 340d. More specifically, in the fifth embodiment, the third section shown in FIG. 13A, where the driving voltage is 0, is divided into two sections, i.e., a section where the driving voltage is +V2 and a section where the driving voltage is −V2.

Of the two divided sections, a section where the potential difference between the mirror 230 and the electrode to which the driving voltage is applied is positive and smaller than the potential difference in the first section will be called a fourth section (a section where the driving voltage +V2 is applied in the example shown in FIG. 15). A section where the potential difference is negative and smaller than the potential difference in the second section will be called a fifth section (a section where the driving voltage −V2 is applied in the example shown in FIG. 15).

The tilt angle of the mirror 230 can be controlled by changing the time ratio of the first section where +V1 is applied and the fourth section where +V2 is applied. On the negative voltage side as well, the tilt angle of the mirror 230 can be controlled by changing the time ratio of the second section where −V1 is applied and the fifth section where −V2 is applied.

As described above, in this embodiment, the section where the driving voltage is 0 is divided into the sections of positive and negative driving voltages, thereby eliminating the influence of floating charges. This allows to further suppress drift of the mirror 230, as compared to the fourth embodiment.

The driving voltages +V1, −V1, +V2, and −V2 need only satisfy |V1|>|V2|. However, if |V1| and |V2| take close voltage values, the change in the electrostatic force caused by changing the time ratio of the two driving voltages is small, resulting in difficulty in tilt angle control of the mirror 230. The driving voltages +V2 and −V2 aim at suppressing the influence of floating charges and need only have a voltage value corresponding to the floating charges or more.

Figure 16:
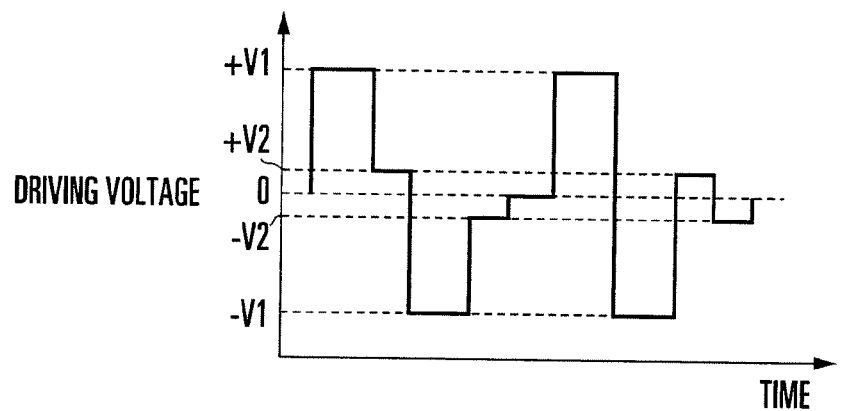
FIG. 16 is a timing chart showing another example of a driving voltage applied to one electrode according to the fifth embodiment of the present invention.

The four driving voltage values can be applied in any order. For example, they can be applied in either an order of +V1, +V2, −V1, and −V2, as shown in FIG. 16, or an order of +V1, −V1, +V2, and −V2.

In this embodiment, the absolute value of the potential difference in the first section is |V1| which is equal to that in the second section. The absolute value of the potential difference in the fourth section is |V2| which is equal to that in the fifth section. Although the absolute value of the potential difference in the first section is preferably equal to that in the second section, they need not always match. Similarly, although the absolute value of the potential difference in the fourth section is preferably equal to that in the fifth section, they need not always match. Even when they do not match, the same effect as described above can be obtained.

A method of controlling the tilt angle of the mirror 230 according to this embodiment will be described next. To control the tilt angle of the mirror 230 using four driving voltage values, as in this embodiment, for example, letting PRa be the time ratio of the section where the driving voltage +V1 or −V1 is applied to the electrode 340a and the section where the driving voltage +V2 or −V2 is applied, the time ratio PRa is set to range from 0 to 1.

Figure 17A:
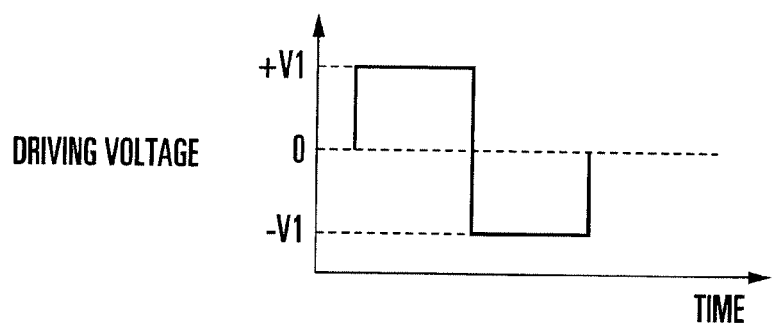
FIGS. 17A to 17C are timing charts for explaining a method of controlling the tilt angle of a mirror according to the fifth embodiment of the present invention.
Figure 17B:
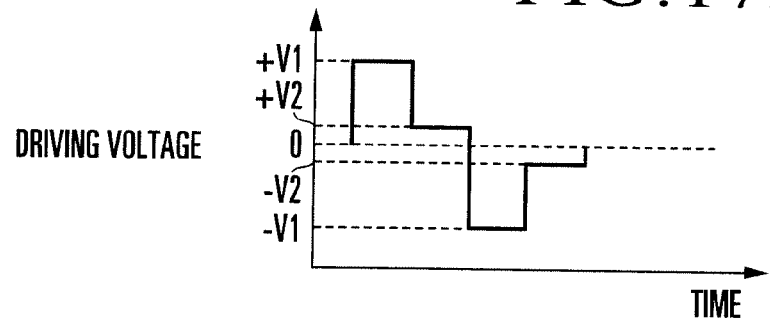
Figure 17C:
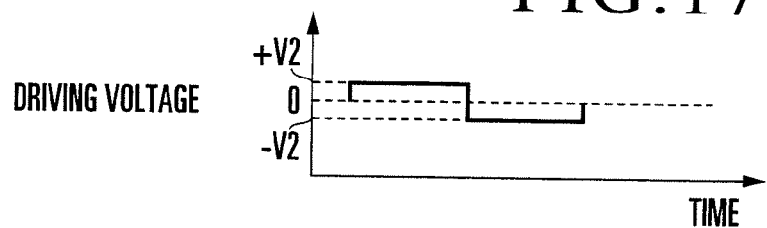

FIG. 17A is a timing chart showing a driving voltage applied to the electrode 340a when PRa=1. FIG. 17B is a timing chart showing a driving voltage applied to the electrode 340a when PRa=0.5. FIG. 17C is a timing chart showing a driving voltage applied to the electrode 340a when PRa=0. As shown in FIG. 17C, when PRa=0, the driving voltage is only +V2 or −V2. When PRa=0.5, the time width of the section where the driving voltage +V1 or −V1 is applied is equal to the time width of the section where the driving voltage +V2 or −V2 is applied. When PRa=1, the driving voltage is only +V1 or −V1. The same control method as that described in the fourth embodiment based on PWa is usable.

When actually controlling the mirror 230, the driving voltage applying unit 501 performs the following processing. The driving voltage applying unit 501 acquires the values of the amplitudes and time widths of driving voltages corresponding to the desired tilt angle of the mirror 230 from a table 502 and applies the driving voltages having the acquired amplitudes and time widths to the electrodes 340a to 340d.

Sixth Embodiment

The sixth embodiment of the present invention will be described next. The four driving voltage values described in the fifth embodiment can be obtained using switching elements. To reduce the number of elements, a voltage is applied to a mirror 230. A mirror control device of the sixth embodiment has the same arrangement as that of the third embodiment. The operation of the sixth embodiment will be described using the reference numerals in FIGS. 1, 2, and 6.

Figure 18A:
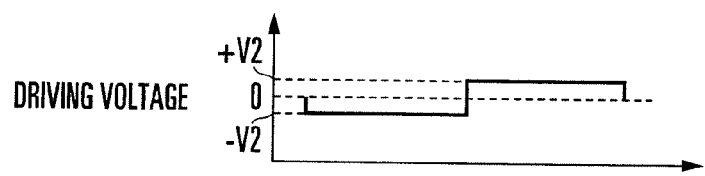
FIG. 18A is a timing chart showing an example of a voltage applied to a mirror according to the sixth embodiment of the present invention.

A mirror voltage applying unit 500 of this embodiment applies a rectangular voltage having an amplitude V2 as shown in FIG. 18A to the mirror 230 via a frame portion 210, torsion springs 211a and 211b, gimbal 220, and torsion springs 221a and 221b.

Figure 18B:
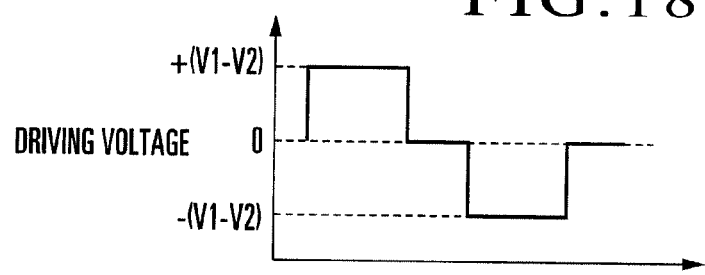
FIG. 18B is a timing chart showing an example of a driving voltage applied to one electrode according to the sixth embodiment of the present invention.
Figure 18C:
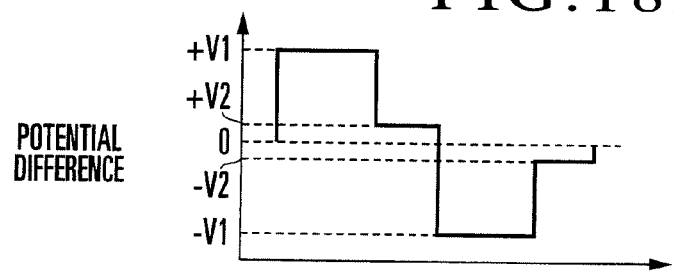
FIG. 18C is a timing chart showing an effective potential difference generated between the electrode and the mirror upon applying the voltages in FIGS. 18A and 18B.

A driving voltage applying unit 501 applies driving voltages which have the same frequency as that of the rectangular wave applied to the mirror 230 and an inverted phase. FIG. 18B is a timing chart showing an example of a driving voltage applied to one of electrodes 340a to 340d according to this embodiment. The amplitude of the driving voltage is (V1−V2). As a result, an effective potential difference as shown in FIG. 18C is generated between the mirror 230 and the electrode to which the driving voltage is applied. The potential difference is equivalent to that generated when the mirror 230 is grounded, and the driving voltage shown in FIG. 15 or 16 is applied to an electrode.

In this embodiment, the tilt angle of the mirror 230 can be changed by controlling the time width of the driving voltage +(V1−V2) and the time width of the driving voltage −(V1−V2) applied to the electrode.

In this embodiment, the same effect as in the fifth embodiment can be obtained in this way. The rectangular voltage applied to the mirror 230 has the same voltage value in the first section (a section where the potential difference is +V1 in the example shown in FIG. 18C) and the fourth section (a section where the potential difference is +V2 in the example shown in FIG. 18C), and the same voltage value in the second section (a section where the potential difference is −V1 in the example shown in FIG. 18C) and the fifth section (a section where the potential difference is −V2 in the example shown in FIG. 18C). The driving voltage applied to the electrode is +(V1−V2) in the first section, −(V1−V2) in the second section, and 0 in the fourth and fifth sections.

In this embodiment, the fixed rectangular wave need only be applied to the mirror 230. For example, when one or more mirrors 230 are arranged in an array and used, the same rectangular wave is applied to all mirrors 230. This decreases the number of switching elements.

Seventh Embodiment

The seventh embodiment of the present invention will be described next. A mirror control device of the seventh embodiment has the same arrangement as that of the third embodiment. The operation of the seventh embodiment will be described using the reference numerals in FIGS. 1, 2, and 6. In this embodiment, drift of a mirror 230 is suppressed by adjusting the time ratio of positive and negative driving voltages.

Figure 19A:
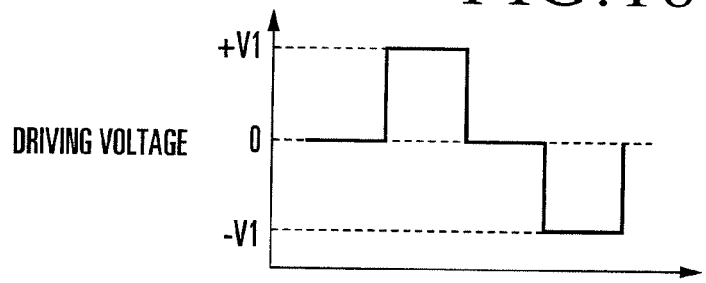
FIGS. 19A and 19B are timing charts for explaining a method of adjusting a driving voltage according to the seventh embodiment of the present invention.

To make the mirror 230 pivot to a desired tilt angle, the time ratio of positive and negative driving voltages to be applied to the electrodes is set to 1:1, as shown in FIG. 19A. However, when the driving voltage applying state shown in FIG. 19A continues for a while, charges may be accumulated in the stray capacitance (e.g., insulating layer 311) between electrodes 340a to 340d and the mirror 230 because of the characteristic difference between the positive and negative voltages.

Figure 19B:
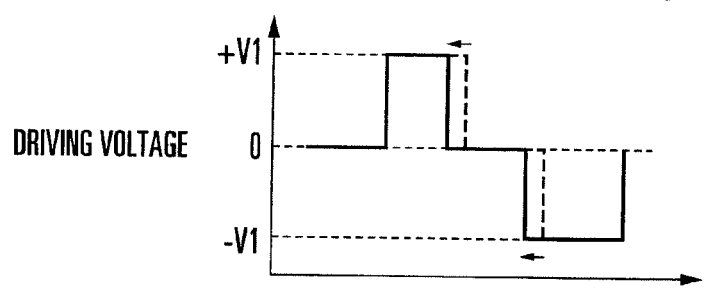

To prevent this, a driving voltage applying unit 501 of this embodiment changes the time ratio of the positive and negative driving voltages, as shown in FIG. 19B. In the example shown in FIG. 19B, the applying time of the positive driving voltage is shortened, and the applying time of the negative driving voltage is prolonged. At this time, the sum of the applying time of the positive driving voltage and that of the negative driving voltage preferably remains unchanged before and after the change in the time ratio. This is because a change in the applying time of the driving voltage means a change in the electrostatic force generated between the electrode and the mirror 230, i.e., a change in the tilt angle of the mirror 230.

When the time ratio of the positive and negative driving voltages is changed from 1:1, floating charges of the polarity of the voltage applied for a longer time readily gather. In this embodiment, the time ratio of the positive and negative driving voltages is appropriately changed by making the applying time of the positive driving voltage shorter or longer than the applying time of the negative driving voltage. This prevents floating charges of any polarity from gathering and also suppresses drift of the mirror 230.

Note that the method of changing the time ratio of the positive and negative driving voltages is applicable to the third embodiment which controls the tilt angle of the mirror 230 based on the amplitude of a driving voltage, the fourth embodiment which controls the tilt angle of the mirror 230 based on the duty ratio of a driving voltage, or the fifth embodiment using four driving voltage values. In the third, fourth, and fifth embodiments, the time ratio of the first section and the second section is adjusted by prolonging the first section and shortening the second section, or by shortening the first section and prolonging the second section. Additionally, in the fifth embodiment, the time ratio of the fourth section and the fifth section is adjusted by prolonging the fourth section and shortening the fifth section, or by shortening the fourth section and prolonging the fifth section.

The third to seventh embodiments may be combined as needed.

Eighth Embodiment

The eighth embodiment of the present invention will be described next. A mirror control device of the seventh embodiment has the same mechanical arrangement as that of the first embodiment and will be described using the reference numerals in FIGS. 1 and 2.

The large difference between the mirror control device of this embodiment and that of the related art is as follows. In the conventional mirror control device, the mirror 230 is grounded. In this embodiment, however, a nonzero voltage is applied to a mirror 230. The voltage applied to the mirror 230 is a voltage (bias voltage) independent of the tilt angle of the mirror 230. The difference between the mirror control device of this embodiment and that of the related art will be described below in more detail.

Figure 20:
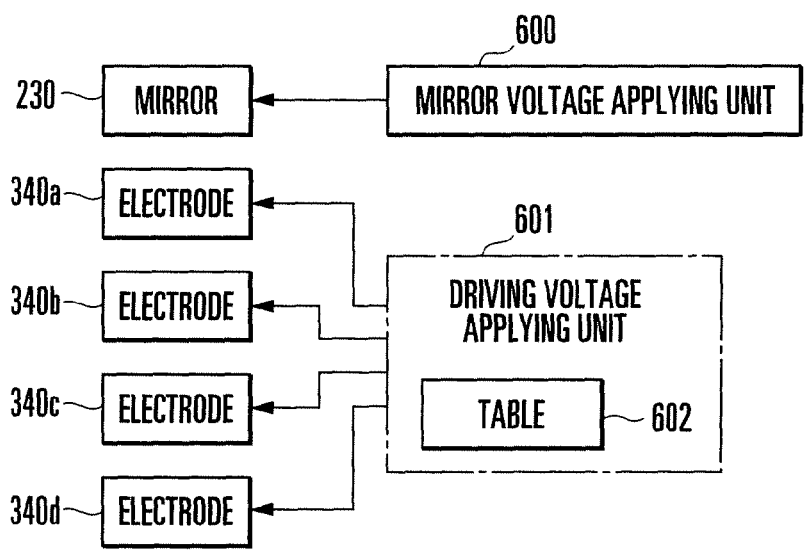
FIG. 20 is a block diagram showing the electrical connection relationship of a mirror control device according to the eighth embodiment of the present invention.

FIG. 20 is a block diagram showing the electrical connection relationship of the mirror control device according to this embodiment. In this embodiment, a bias voltage applying unit 600 applies a bias voltage to the mirror 230. A driving voltage applying unit 601 applies a driving voltage to at least one of electrodes 340a to 340d. The driving voltage applying unit 601 incorporates a table 602 in which the relationship between the tilt angle of the mirror 230 and the driving voltage value is set in advance. The driving voltage applying unit 601 acquires driving voltage values corresponding to the desired tilt angle of the mirror 230 from the table 602 and applies the driving voltages to the electrodes 340a to 340d. The bias voltage is applied to the mirror 230 via a frame portion 210, torsion springs 211a and 211b, gimbal 220, and torsion springs 221a and 221b. The driving voltages are applied to the electrodes 340a to 340d via leads 341a to 341d, respectively.

Figure 21:
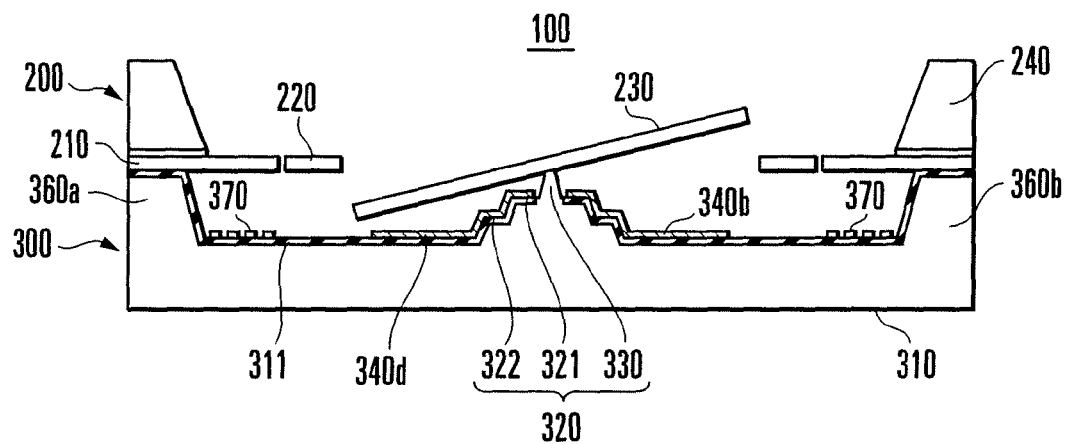
FIG. 21 is a sectional view showing a pivot of a mirror according to the eighth embodiment of the present invention.

Assume that a bias voltage −Vm is applied to the mirror 230, a driving voltage −Vx is applied to the electrode 340b, and a driving voltage +Vx is applied to the electrode 340d. This makes the mirror 230 pivot toward the electrode 340d, as shown in FIG. 21. Voltage application at this time is the same as in applying a voltage of 0 V to the mirror 230, a driving voltage (Vm−Vx) to the electrode 340b, and a driving voltage (Vm+Vx) to the electrode 340d in the conventional mirror control device. As for the voltage values, the conventional mirror control device requires a voltage (Vm+Vx) at maximum. In this embodiment, one of Vm and Vx is the maximum voltage, and it is therefore possible to lower the driving voltage as compared to the conventional mirror control device.

As described above, in this embodiment, since the driving voltage can be lowered, a power supply for outputting a lower voltage is usable for the bias voltage applying unit 600 and the driving voltage applying unit 601.

When a nonzero bias voltage is applied to the mirror 230, as in this embodiment, a driving voltage of a polarity opposite to the bias voltage is preferably applied to at least one of the electrodes 340a to 340d. The reason is as follows. When a driving voltage of a polarity opposite to the bias voltage is applied to at least one of the electrodes 340a to 340d, the potential differences between the electrodes 340a to 340d can be made larger than in an arrangement that applies driving voltages of the same polarity as the bias voltage to the electrodes 340a to 340d, and the force for driving the mirror 230 can be increased.

Due to the same reason as described above, when driving voltages are applied to a pair of electrodes (electrodes 340b and 340d in the example of this embodiment) concerned in the driving of the mirror 230, a driving voltage of the same polarity as the bias voltage is applied to one of the pair of electrodes, and a driving voltage of a polarity opposite to the bias voltage is applied to the other electrode. The mirror 230 pivots toward the electrode to which the driving voltage of a polarity opposite to the bias voltage is applied. The driving force at this time can be increased.

Ninth Embodiment

Figure 22:
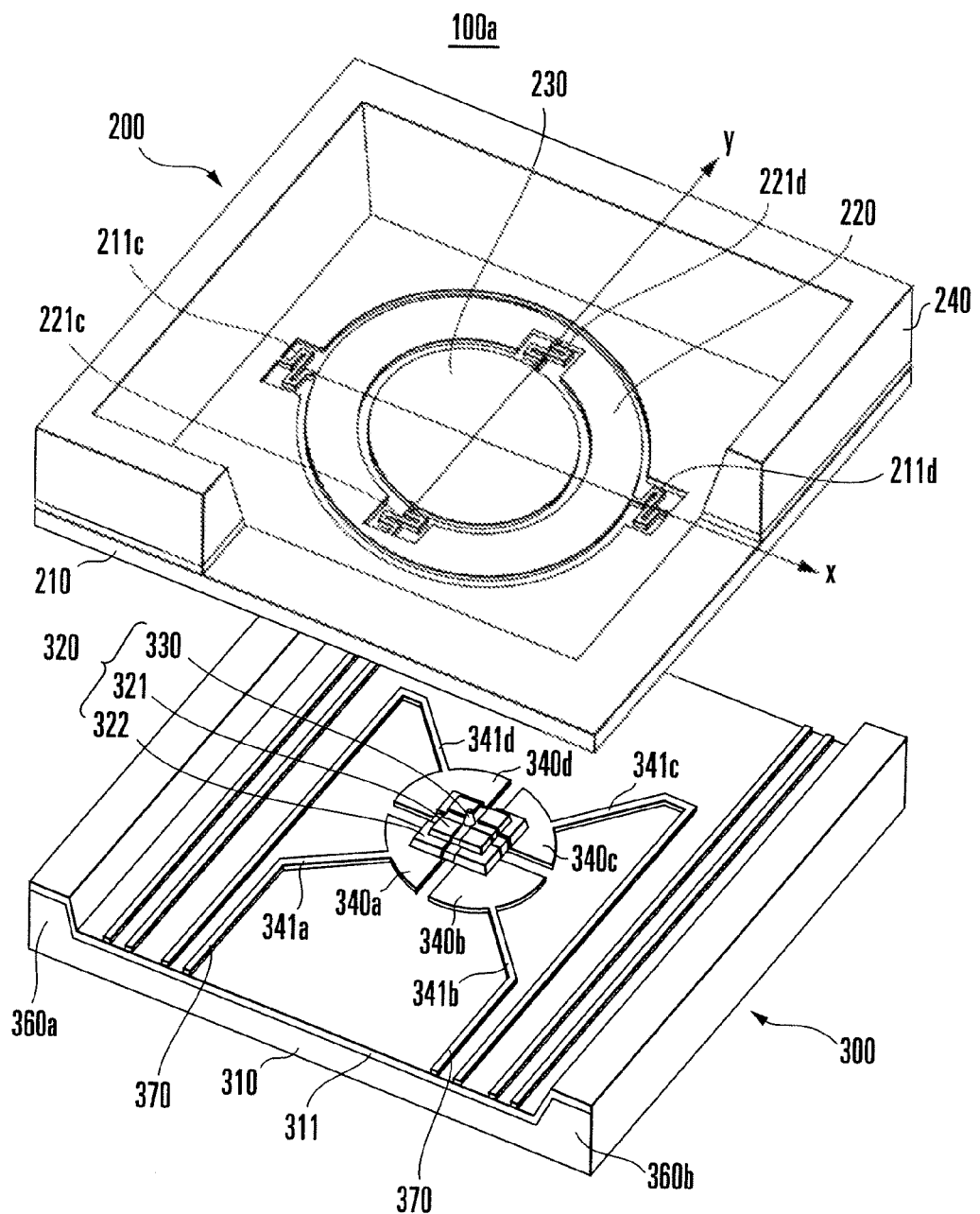
FIG. 22 is an exploded perspective view showing the arrangement of a mirror control device according to the ninth embodiment of the present invention.

The ninth embodiment of the present invention will be described next. FIG. 22 is an exploded perspective view showing the arrangement of a mirror control device according to the ninth embodiment of the present invention. In the eighth embodiment, the gimbal pivot axis x and the mirror pivot axis y cross the parting lines of the electrodes 340a to 340d at 45°. In a mirror control device 100a of the ninth embodiment, however, a gimbal pivot axis x passing through torsion springs 211c and 211d and a mirror pivot axis y passing through torsion springs 221c and 221d are parallel to the parting lines of electrodes 340a to 340d.

The mirror control device of this embodiment has the same electrical connection relationship as in FIG. 20. A bias voltage applying unit 600 applies a bias voltage −Vm to a mirror 230. Let Vx be the driving voltage necessary for making the mirror 230 pivot about the gimbal pivot axis x, and Vy be the driving voltage necessary for making the mirror 230 pivot about the mirror pivot axis y (Vx and Vy have arbitrary values). A driving voltage applying unit 601 applies a driving voltage (Vx+Vy) to the electrode 340a, a driving voltage (Vx−Vy) to the electrode 340b, a driving voltage (−Vx−Vy) to the electrode 340c, and a driving voltage (−Vx+Vy) to the electrode 340d. This makes the mirror 230 pivot in a direction corresponding to the potential differences between the electrodes 340a to 340d.

Voltage application at this time is the same as in applying a voltage of 0 V to the mirror 230, a driving voltage (Vm+Vx+Vy) to the electrode 340b, a driving voltage (Vm+Vx−Vy) to the electrode 340b, a driving voltage (Vm−Vx−Vy) to the electrode 340c, and a driving voltage (Vm−Vx+Vy) to the electrode 340d in the conventional mirror control device. The conventional mirror control device requires a voltage (Vm+Vx+Vy) at maximum. In this embodiment, a larger one of Vm and (Vx+Vy) is the maximum voltage, and it is therefore possible to lower the driving voltage as compared to the conventional mirror control device. In this embodiment, the same effect as in the eighth embodiment can be obtained in this way.

10th Embodiment

In the eighth and ninth embodiments, the bias voltage and the driving voltages are DC voltages. They may be periodical voltages (AC voltages). For example, in the eighth embodiment, a periodical bias voltage as shown in FIG. 23A is applied to the mirror 230. A periodical driving voltage as shown in FIG. 23B, which is in synchronism with the bias voltage, is applied to the electrode 340b. A periodical driving voltage as shown in FIG. 23C, which is in synchronism with the bias voltage, is applied to the electrode 340d. This makes the mirror 230 pivot toward the electrode 340b.

At this time, the bias voltage and the driving voltages are preferably AC voltages whose DC component is 0. If the DC component of the bias voltage and the driving voltages is not 0, the mirror 230 may vibrate in accordance with the frequencies of the bias voltage and the driving voltages. This is particularly conspicuous when the frequency of a driving voltage is lower than the mirror resonance frequency. However, when the DC component of the driving voltage is 0, vibration of the mirror 230 can be reduced. A rectangular voltage whose DC component is 0 can suppress vibration of the mirror 230 at any frequency regardless of the mirror resonance frequency in principle. In the 10th embodiment, when a bias voltage and driving voltages whose DC component is 0 are used, the influence of charges accumulated in the stray capacitance such as an insulating layer between the electrodes and the mirror 230 can be almost eliminated. It is therefore possible to suppress drift of the mirror 230 caused by charges accumulated in the stray capacitance.

As in the eighth embodiment, when driving voltages are applied to a pair of electrodes concerned in the driving of the mirror 230, a driving voltage having the same polarity as the bias voltage and being in synchronism with it is applied to one of the pair of electrodes, and a driving voltage having a polarity opposite to the bias voltage and being in synchronism with it is applied to the other electrode. This increases the force for driving the mirror 230, as in the eighth embodiment. In the examples shown in FIGS. 23A to 23C, a driving voltage of a polarity opposite to the bias voltage is applied to the electrode 340b, and a driving voltage of the same polarity as the bias voltage is applied to the electrode 340d.

The AC voltages applied to the mirror 230 and the electrodes 340a to 340d are preferably rectangular waves because they can increase the driving force. However, any wave such as a sine wave other than the rectangular wave is also usable.

INDUSTRIAL APPLICABILITY

The present invention is applicable to a mirror control device, and a mirror array including a plurality of mirror control devices two-dimensionally arrayed.

The invention claimed is:

1. A mirror control device characterized by comprising:
a mirror which is pivotally supported;
a plurality of electrodes which are spaced apart from said mirror;
driving voltage generation means for generating a driving voltage corresponding to a desired tilt angle of said mirror for each electrode;
bias voltage generation means for generating, as a bias voltage for each electrode, a voltage which causes the tilt angle of said mirror to have a predetermined value upon being independently applied to each electrode; and
electrode voltage applying means for adding, for each electrode, the bias voltage to the driving voltage and applying the voltage after addition to a corresponding one of said electrodes.

2. A mirror control device according to claim 1, characterized in that, when adding the bias voltage to the driving voltage, said electrode voltage applying means multiplies the driving voltage before addition by a coefficient which changes between the said electrodes.

3. A mirror control device according to claim 2, characterized in that the coefficient is set in advance for each electrode based on a tilt, between two arbitrary points, of a voltage vs. tilt angle characteristic of said mirror for each electrode.

4. A mirror control device according to claim 1, characterized in that at least one of the bias voltages of said electrodes is different from the remaining bias voltages.

5. A mirror control device according to claim 1, characterized in that the bias voltages of said electrodes are different.

6. A mirror control device according to claim 1, characterized in that
said mirror pivots about two axes perpendicular to each other, and
the bias voltage changes between two electrodes which are arranged symmetrically with respect to a plane including one pivot axis and perpendicular to a mirror surface at a zero tilt angle and two electrodes which are arranged symmetrically with respect to a plane including the other pivot axis and perpendicular to the mirror surface.

7. A mirror control device characterized by comprising:
a mirror which is pivotally supported;
a plurality of electrodes which are spaced apart from said mirror; and
driving voltage applying means for generating an AC voltage as a driving voltage in accordance with a desired tilt angle of said mirror and applying the driving voltage to each electrode so as to generate at least a first section where a potential difference between said mirror and said electrode to which the driving voltage is applied is positive and a second section where the potential difference between said mirror and said electrode to which the driving voltage is applied is negative.

8. A mirror control device according to claim 7, characterized in that said driving voltage applying means generates the driving voltage so as to make an average DC component of the potential difference substantially zero for each electrode.

9. A mirror control device according to claim 7, characterized in that said driving voltage applying means generates, as the driving voltage, an AC voltage having an amplitude corresponding to the desired tilt angle of said mirror.

10. A mirror control device according to claim 7, characterized in that said driving voltage applying means generates the driving voltage so as to further generate, in addition to the first section and the second section, a third section where the potential difference is a potential between the potential difference in the first section and the potential difference in the second section, and changes a ratio of a sum of a time width of the first section and a time width of the second section to a time width of the third section in accordance with the desired tilt angle of said mirror.

11. A mirror control device according to claim 10, characterized in that said driving voltage applying means generates the driving voltage so as to make an absolute value of the potential difference in the first section equal to an absolute value of the potential difference in the second section.

12. A mirror control device according to claim 7, characterized in that the driving voltage is a rectangular voltage.

13. A mirror control device according to claim 7, characterized in that the driving voltage is a sinusoidal voltage.

14. A mirror control device according to claim 10, characterized in that said driving voltage applying means generates the driving voltage so as to make the third section include a fourth section where the potential difference is positive and smaller than the potential difference in the first section and a fifth section where the potential difference is negative and smaller than the potential difference in the second section.

15. A mirror control device according to claim 14, characterized in that said driving voltage applying means generates the driving voltage so as to make the absolute value of the potential difference in the first section equal to the absolute value of the potential difference in the second section and make an absolute value of the potential difference in the fourth section equal to an absolute value of the potential difference in the fifth section.

16. A mirror control device according to claim 7, characterized in that said driving voltage applying means changes a time ratio of the first section and the second section to prolong the first section and shorten the second section, or shorten the first section and prolong the second section.

17. A mirror control device according to claim 14, characterized in that said driving voltage applying means changes a time ratio of the fourth section and the fifth section to prolong the fourth section and shorten the fifth section, or shorten the fourth section and prolong the fifth section.

18. A mirror control device according to claim 7, characterized in that a time width of each section is shorter than a reciprocal of a resonance frequency of a tilting motion of said mirror.

19. A mirror control device according to claim 9, characterized in that said driving voltage applying means changes the amplitude of the driving voltage to a first electrode and the amplitude of the driving voltage to a second electrode differentially to both sides of a fixed value in accordance with the tilt angle, the first electrode generating a force in a positive direction of the tilt angle of said mirror, and the second electrode generating a force in a negative direction of the tilt angle.

20. A mirror control device according to claim 10, characterized in that said driving voltage applying means changes the ratio of the driving voltage to a first electrode and the ratio of the driving voltage to a second electrode differentially to both sides of a fixed value in accordance with the tilt angle, the first electrode generating a force in a positive direction of the tilt angle of said mirror, and the second electrode generating a force in a negative direction of the tilt angle.

21. A mirror control device according to claim 14, characterized by further comprising mirror voltage applying means for applying voltages having the same value to said mirror in the first section and the fourth section and applying voltages having the same value and a polarity opposite to that in the first section and the fourth section to said mirror in the second section and the fifth section, wherein said driving voltage applying means generates a driving voltage which is 0 in the fourth section and the fifth section.

22. A mirror control device characterized by comprising:
a mirror which is pivotally supported;
a plurality of electrodes which are spaced apart from said mirror;
bias voltage applying means for applying a nonzero bias voltage to said mirror; and
driving voltage applying means for applying a driving voltage of a polarity opposite to the bias voltage to at least one of said plurality of electrodes.

23. A mirror control device according to claim 22, characterized in that said driving voltage applying means applies a driving voltage of the same polarity as the bias voltage to one of electrodes which are arranged symmetrically with respect to a plane including a pivot axis of said mirror and perpendicular to a mirror surface at a zero tilt angle, and applies the driving voltage of the polarity opposite to the bias voltage to the other electrode.

24. A mirror control device according to claim 22, characterized in that each of the bias voltage and the driving voltage is a DC voltage.

25. A mirror control device according to claim 22, characterized in that each of the bias voltage and the driving voltage is an AC voltage.

26. A mirror control device according to claim 25, characterized in that a DC component of the AC voltage is 0.

27. A mirror control device according to claim 25, characterized in that each of the bias voltage and the driving voltage is a rectangular voltage.

* * * * *